United States Patent
Kamath et al.

(10) Patent No.: US 8,812,904 B2
(45) Date of Patent: *Aug. 19, 2014

(54) SYSTEMS AND METHODS FOR LOAD BALANCING VIA A PLURALITY OF VIRTUAL SERVERS UPON FAILOVER USING METRICS FROM A BACKUP VIRTUAL SERVER

(75) Inventors: Sandeep Kamath, Santa Clara, CA (US); Josephine Suganthi, Sunnyvale, CA (US); Sergey Verzunov, Moscow (RU); Murali Raja, Santa Clara, CA (US); Anil Shetty, Union City, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 216 days.

This patent is subject to a terminal disclaimer.

(21) Appl. No.: 13/302,880

(22) Filed: Nov. 22, 2011

(65) Prior Publication Data

US 2012/0072588 A1  Mar. 22, 2012

Related U.S. Application Data

(63) Continuation of application No. 12/128,978, filed on May 29, 2008, now Pat. No. 8,065,559.

(51) Int. Cl.
*G06F 11/00* (2006.01)

(52) U.S. Cl.
USPC ............ 714/10; 714/4.11; 714/4.12; 714/11; 714/13

(58) Field of Classification Search
USPC .............................. 714/4.11, 4.12, 10, 11, 13
See application file for complete search history.

(56) References Cited

U.S. PATENT DOCUMENTS

| | | | |
|---|---|---|---|
| 7,287,186 B2 | 10/2007 | McCrory et al. | |
| 8,307,239 B1 * | 11/2012 | Keith, Jr. | 714/4.11 |
| 2003/0018927 A1 | 1/2003 | Gadir et al. | |
| 2005/0108593 A1 | 5/2005 | Purushothaman et al. | |
| 2008/0049786 A1 | 2/2008 | Ram et al. | |
| 2010/0293409 A1 | 11/2010 | Machida | |

FOREIGN PATENT DOCUMENTS

WO   WO-2008/112698 A2   9/2008

OTHER PUBLICATIONS

Chinese Notification to Make Rectification on 200980130117.9 dated Feb. 28, 2011.
Chinese Office Action dated Nov. 1, 2012 in Chinese Patent Application No. 200980130117.9.

(Continued)

*Primary Examiner* — Michael Maskulinski
(74) *Attorney, Agent, or Firm* — Foley & Lardner LLP; Christopher J. McKenna

(57) ABSTRACT

The present invention provides methods and systems for performing load balancing via a plurality of virtual servers upon a failover using metrics from a backup virtual server. The methods and systems described herein provide systems and methods for an appliance detecting that a first virtual server of a plurality of virtual servers having one or more backup virtual servers load balanced by an appliance is not available, identifying at least a first backup virtual server of a one or more backup virtual servers of the first virtual server is available, maintaining a status of the first virtual server as available in response to the identification, obtaining one or more metrics from the first backup virtual server of a one or more backup virtual servers, and determining the load across the plurality of virtual servers using the metrics obtained from the first backup virtual server associated with the first virtual server.

20 Claims, 14 Drawing Sheets

(56) References Cited

OTHER PUBLICATIONS

Coyote Point Systems, Inc.: Coyote Point Introduces Equailzer VLB for High Application Availability and Acceleration of Vmware Virtual Servers Press Releases, [Online] Apr. 29, 2008, pp. 1-3, retrieved from the internet: URL http://www.coyotepoint.com/article.php?id=73>.

EPO Communication regarding rules 161 and 162 on 09755673.2 dated Jan. 19, 2011.

International Preliminary Report on Patentability PCT/US2009/045247 mailed Nov. 30, 2010.

International Search Report (PCT/US2009/045247) mailed Dec. 3, 2009.

Myung-Sup Kim, et al. Highly Available and Efficient Load Cluster Management System using SNMP and Web, Jan. 1, 2002, pp. 619-632. Retrieved from the Internet at http://ieeexplore.ieee.org/stamp/stamp.jsp?arnumber=01015612.

Notice of Allowance on U.S. Appl. No. 12/128,978 dated Jul. 15, 2011.

Office Action on U.S. Appl. No. 12/128,978 dated Nov. 5, 2010.

Written Opinion of International Seach Authority (PCT/US2009/045247) mailed Nov. 29, 2010.

Office Action on U.S. Appl. No. 12/128,978 dated Jun. 22, 2010.

* cited by examiner

SYSTEMS AND METHODS FOR LOAD BALANCING VIA A PLURALITY OF VIRTUAL SERVERS UPON FAILOVER USING METRICS FROM A BACKUP VIRTUAL SERVER

RELATED APPLICATION

The present application is a continuation of and claims priority to U.S. patent application Ser. No. 12/128,978, entitled "SYSTEMS AND METHODS FOR LOAD BALANCING VIA A PLURALITY OF VIRTUAL SERVERS UPON FAILOVER USING METRICS FROM A BACKUP VIRTUAL SERVER, filed May 29, 2008, which is incorporated herein by reference in its entirety for all purposes.

FIELD OF THE INVENTION

The present application generally relates to data communication networks. In particular, the present application relates to systems and methods for performing load balancing via a plurality of virtual servers upon a failover using metrics from a backup virtual server.

BACKGROUND OF THE INVENTION

A corporate or enterprise may deploy various services across a network to serve many users. For example, a user on a client may request to access a service, such as a web server. The enterprise may deploy multiple servers to provide this service in order to meet the demand and load from a volume of users accessing the service. For example, a server farm may provide a group of servers that can process the client's request. Additionally, the enterprise may deploy a load balancer to manage access to the multiple servers and direct client requests to a suitable server based on load. A load balancer distributes the load across multiple servers or services by selecting a next server to service a received request based on a scheduling or load distribution algorithm such as round robin. The load balancer may monitor requests and responses between a client and a server to determine the load or status of the server.

A load balancer may comprise any number of virtual servers for servicing requests, such as load balancing requests. When one of the virtual servers servicing requests experiences a failure, the service provided by the load balancer may be interrupted or experience a delay. Other virtual servers may take on the traffic which was serviced by the failed virtual server.

BRIEF SUMMARY OF THE INVENTION

The present disclosure relates to improvements to systems and methods for load balancing. The present disclosure also relates to a solution for performing load balancing via a plurality of virtual servers upon a failover using metrics from a backup virtual server. The systems and methods described herein provide a load balancing technique in which load balancing may be maintained in spite of detecting of one or more virtual servers as not available. In some aspect, the present disclosure combines the functionalities of virtual servers and backup virtual servers to maintain a load balancing service provided in spite of failures of any number of virtual servers or backup virtual servers. As such, an appliance comprising a plurality of virtual servers and a plurality of backup virtual servers may be configured to view a first virtual server of the plurality of virtual servers and backup virtual servers associated with the first virtual server as a logical unit wherein each of the backup virtual servers associated with the first virtual server is capable of performing any function or providing any service the first virtual server provides.

In some aspects, the present disclosure relates to a method of performing load balancing via a plurality of virtual servers upon a failover using metrics from a backup virtual server. In some embodiments the method comprises a step of an appliance detecting that a first virtual server of a plurality of virtual servers load balanced by an appliance is not available. In some embodiments, the first virtual server may have one or more backup virtual servers. The method may also comprise the step of the appliance identifying that at least a first backup virtual server of a one or more backup virtual servers of the first virtual server is available. In many embodiments, the method comprises the appliance maintaining a status of the first virtual server as available in response to the identification and obtaining one or more metrics from the first backup virtual server of a one or more backup virtual servers. In a plurality of embodiments, the method comprises the appliance determining the load across the plurality of virtual servers using the metrics obtained from the first backup virtual server associated with the first virtual server.

In a number of embodiments, the method includes a step of the appliance identifying the first virtual backup server is unavailable and the appliance obtaining metrics from the second backup virtual server. In some embodiments, the method comprises the step of the appliance determining the load across the second backup virtual server and the plurality of virtual servers using the metrics obtained from the second backup virtual server. In a plurality of embodiments, the method includes determining, by the appliance, one of the load across the second backup virtual server or the load across the plurality of virtual servers using the metrics obtained from the second backup virtual server.

In some embodiments, the method includes the step of identifying, by the appliance, that the first virtual server is available. In certain embodiments, the method includes determining, by the appliance, the load across the plurality of virtual servers using the metrics obtained from the first backup virtual server. The method, in some aspects, may also comprise the step of continuing, by the appliance, to transmit requests directed to the first virtual server to the one of the first backup virtual server or the first virtual server.

In a number of embodiments, the method comprises the appliance determining the load across the plurality of virtual servers using metrics from one or more of a plurality of backup virtual servers. In some embodiments, the method includes the step of determining, by a global load balancing virtual server of the appliance, the load across the plurality of virtual servers. In a plurality of embodiments, the method includes the step of executing, by one of the appliance or a second appliance, the first virtual server. In certain embodiments, the method includes the step of obtaining, by the appliance, the one of metrics via a metric exchanging protocol or Simple Network Management Protocol (SNMP).

In some embodiments, the one or more metrics introduced in the method may comprise: a number of connections, a number of packets sent to or transmitted by the virtual server, a response time of the service load balanced by a virtual server, or use of network bandwidth by the service. In a plurality of embodiments, the method includes the step of identifying, by a user, one or more metrics of one of the first virtual backup server or the virtual server to collection for load balancing. In a number of embodiments, the method includes identifying, by the user, one of a weight or a threshold to assign to each of the user selected metrics.

In some aspects, the present invention relates to a system for performing load balancing via a plurality of virtual servers upon a failover using metrics from a backup virtual server. In some embodiments, the system comprises an appliance load balancing a plurality of virtual servers, wherein a first virtual server of the plurality of virtual servers has one or more backup virtual servers. The system also includes a monitoring agent of the appliance detecting that the first virtual server is not available, identifying that a first backup virtual server of the one or more backup virtual servers is available and maintaining the status of the first virtual server as available in response to identification. The system further includes a load monitor of the appliance obtaining one or more metrics from the first backup virtual server of the plurality of the one or more backup virtual servers and determining the load across the plurality of virtual servers using the metrics obtained from the first backup virtual server of a one or more backup virtual servers, and a means for determining the load across the plurality of virtual servers using the metrics obtained from the first backup virtual server associated with the first virtual server.

BRIEF DESCRIPTION OF THE FIGURES

The foregoing and other objects, aspects, features, and advantages of the invention will become more apparent and better understood by referring to the following description taken in conjunction with the accompanying drawings, in which.

Figure 1A:
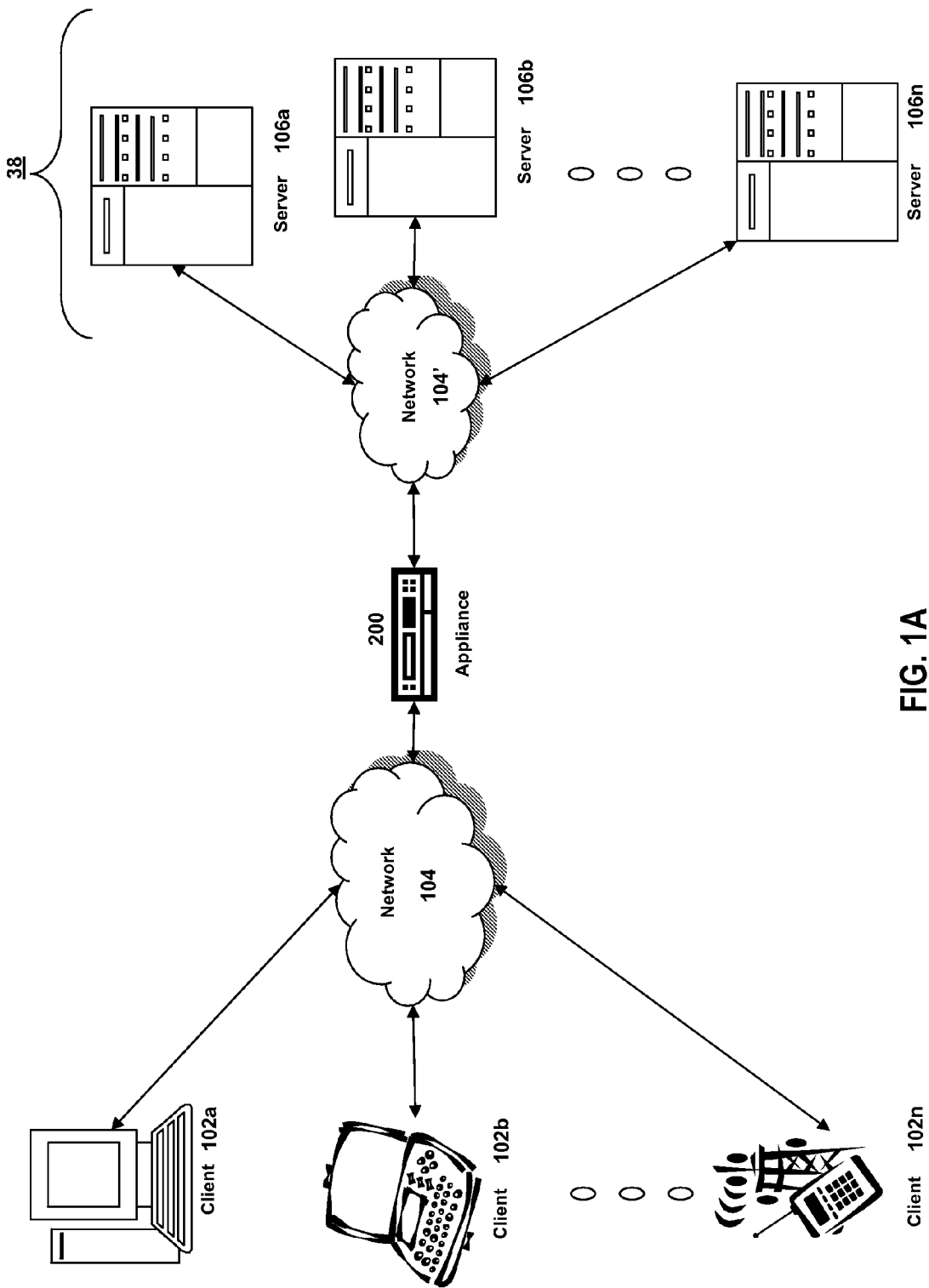
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments of the present invention below, the following descriptions of the sections of the specification and their respective contents may be helpful:

Section A describes a network environment and computing environment useful for practicing an embodiment of the present invention;

Section B describes embodiments of a system and appliance architecture for accelerating delivery of a computing environment to a remote user;

Section C describes embodiments of a client agent for accelerating communications between a client and a server;

Section D describes embodiments of systems and methods for load balancing based on metrics selected by a user from appliance determined metrics and/or metrics collected from a device via a Simple Network Management Protocol; and Section E describes embodiments of systems and methods for global server load balancing among heterogeneous devices.

Section F describes embodiments of systems and methods for load balancing via a plurality of virtual servers upon failover using metrics from a backup virtual server.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104' may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
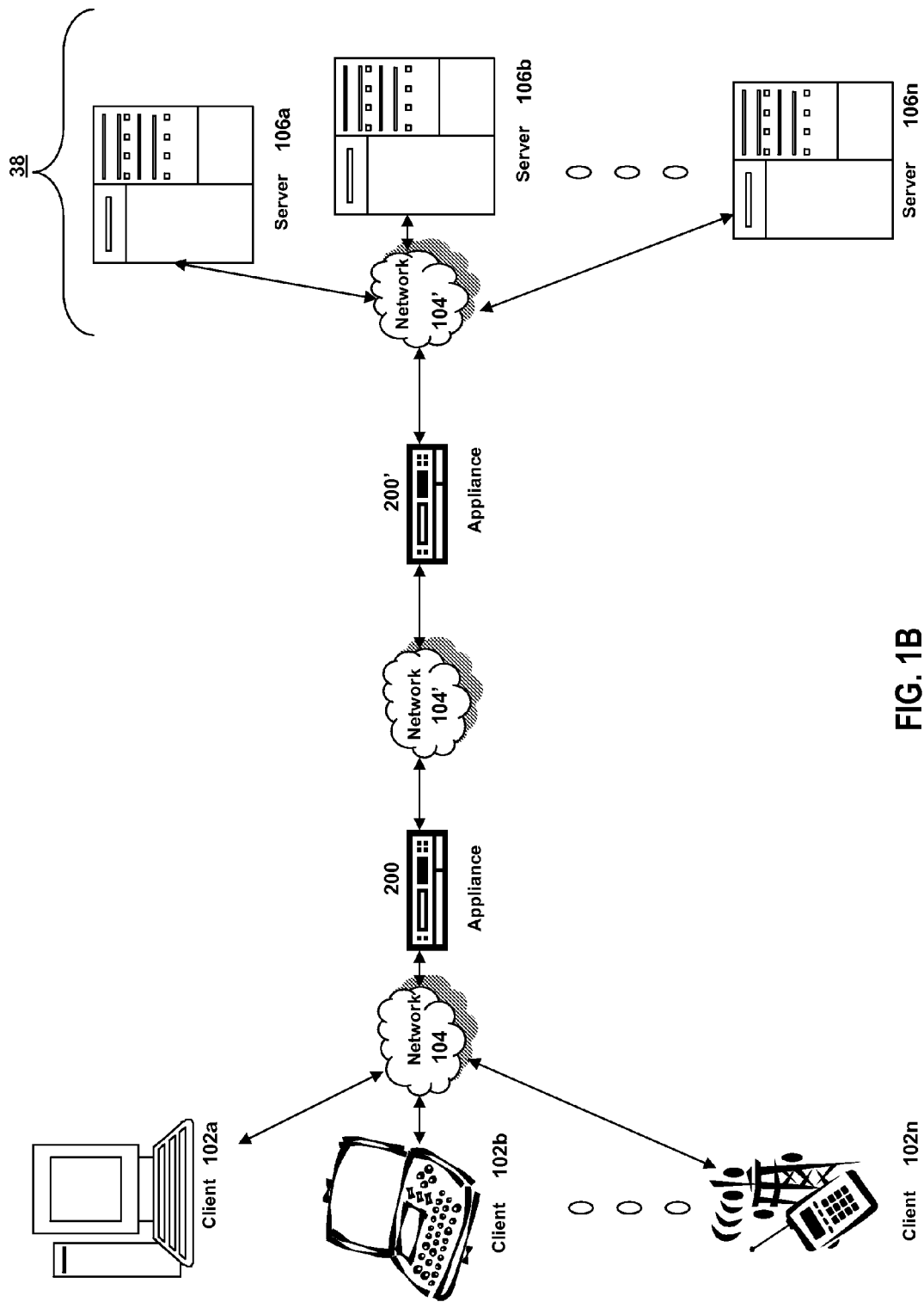
FIG. 1B is a block diagram of an embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server.

Figure 1C:
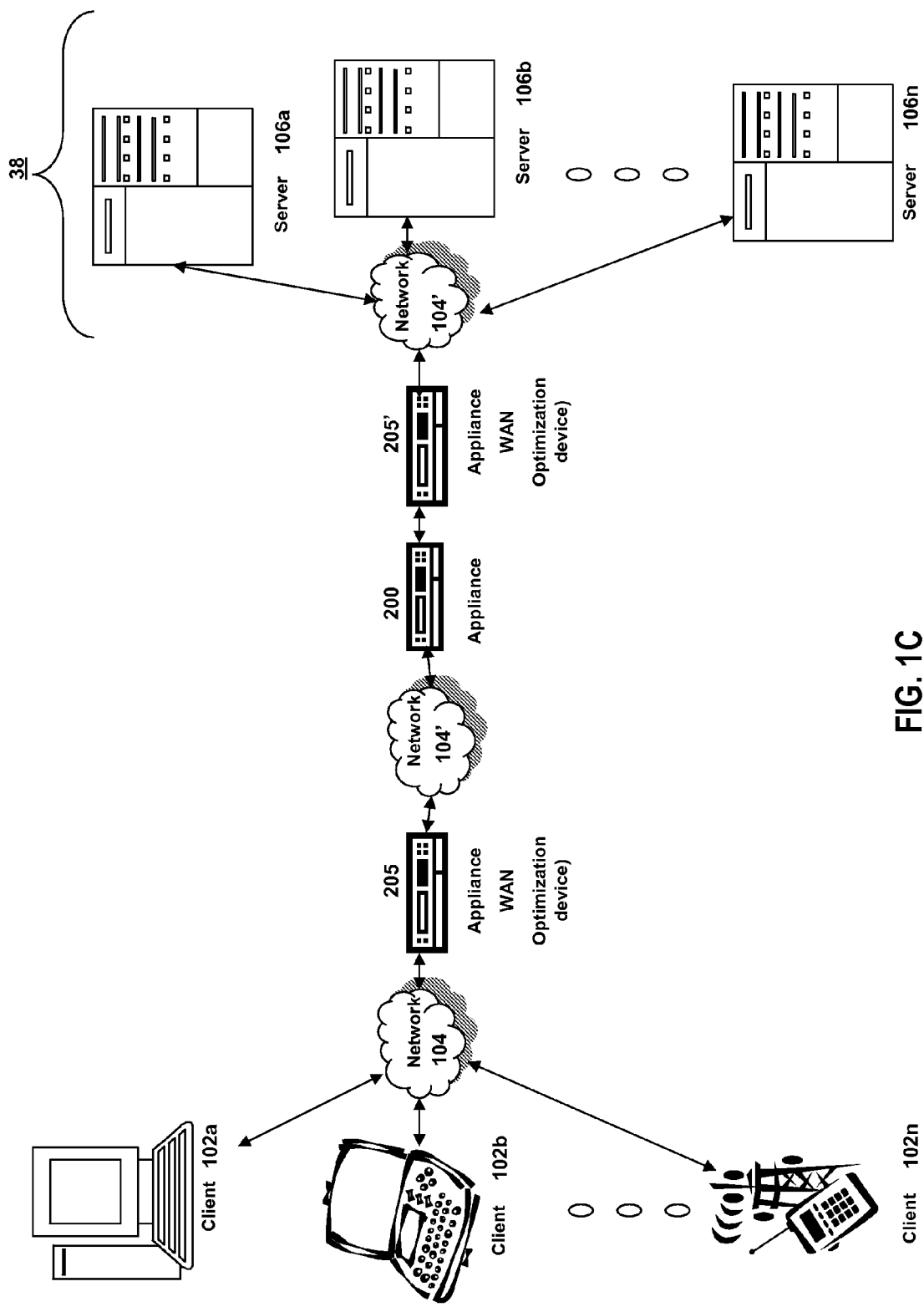
FIG. 1C is a block diagram of an embodiment of an environment for delivering a computing environment from a server to a client via a network.

Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and s second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205' may be located on network 104' or network 104". In one embodiment, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'.

In one embodiment, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In one embodiment, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In one embodiment, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In one embodiment, the appliance 205 provides application and data acceleration services for branch-office or remote offices. In one embodiment, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In one embodiment, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, in one embodiment, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In one embodiment, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
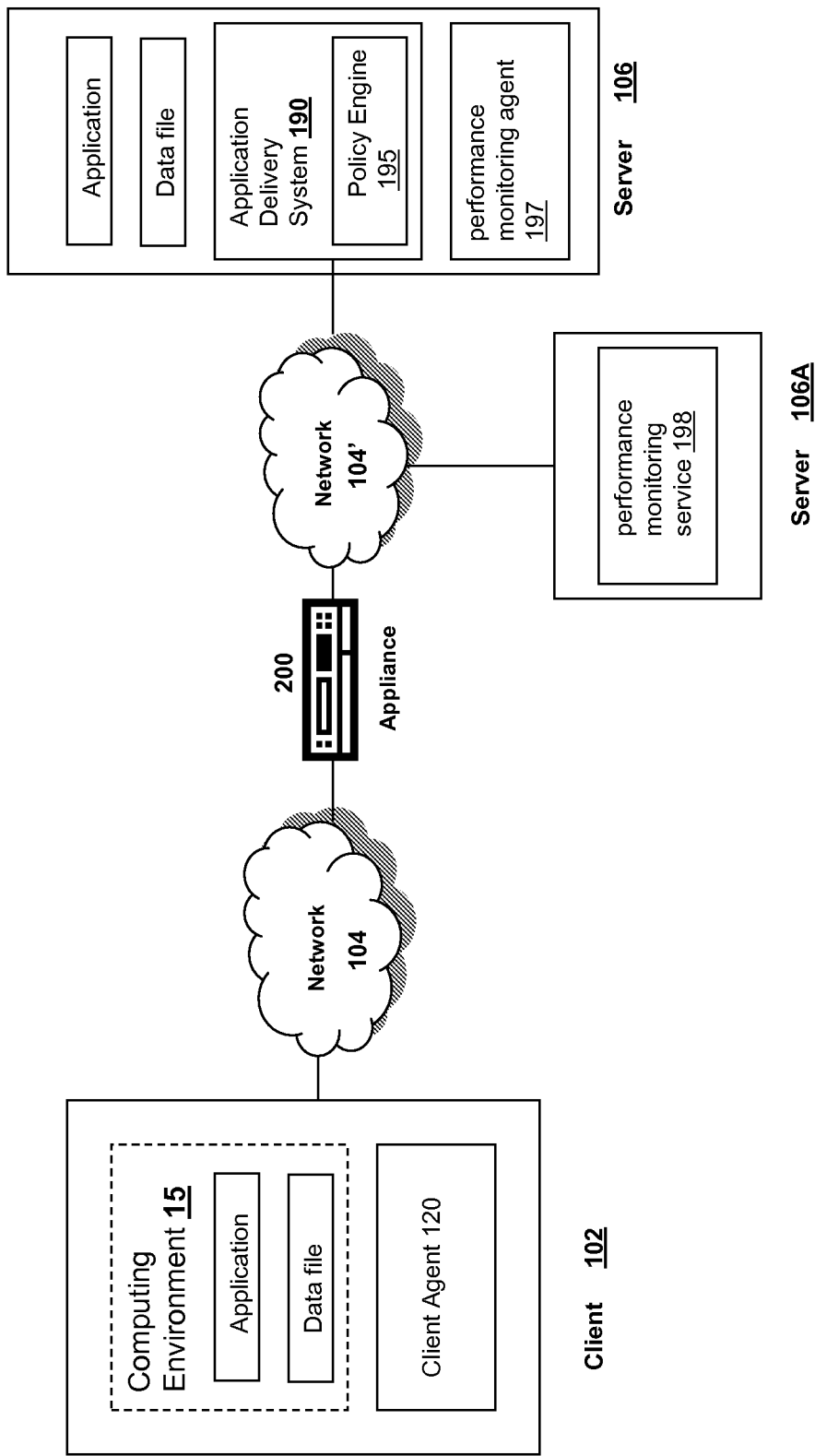
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In one embodiment, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In one embodiment, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In one embodiment, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In one embodiment, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In one embodiment, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In one embodiment, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In one embodiment, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In one embodiment, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In one embodiment, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In one embodiment, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In one embodiment, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
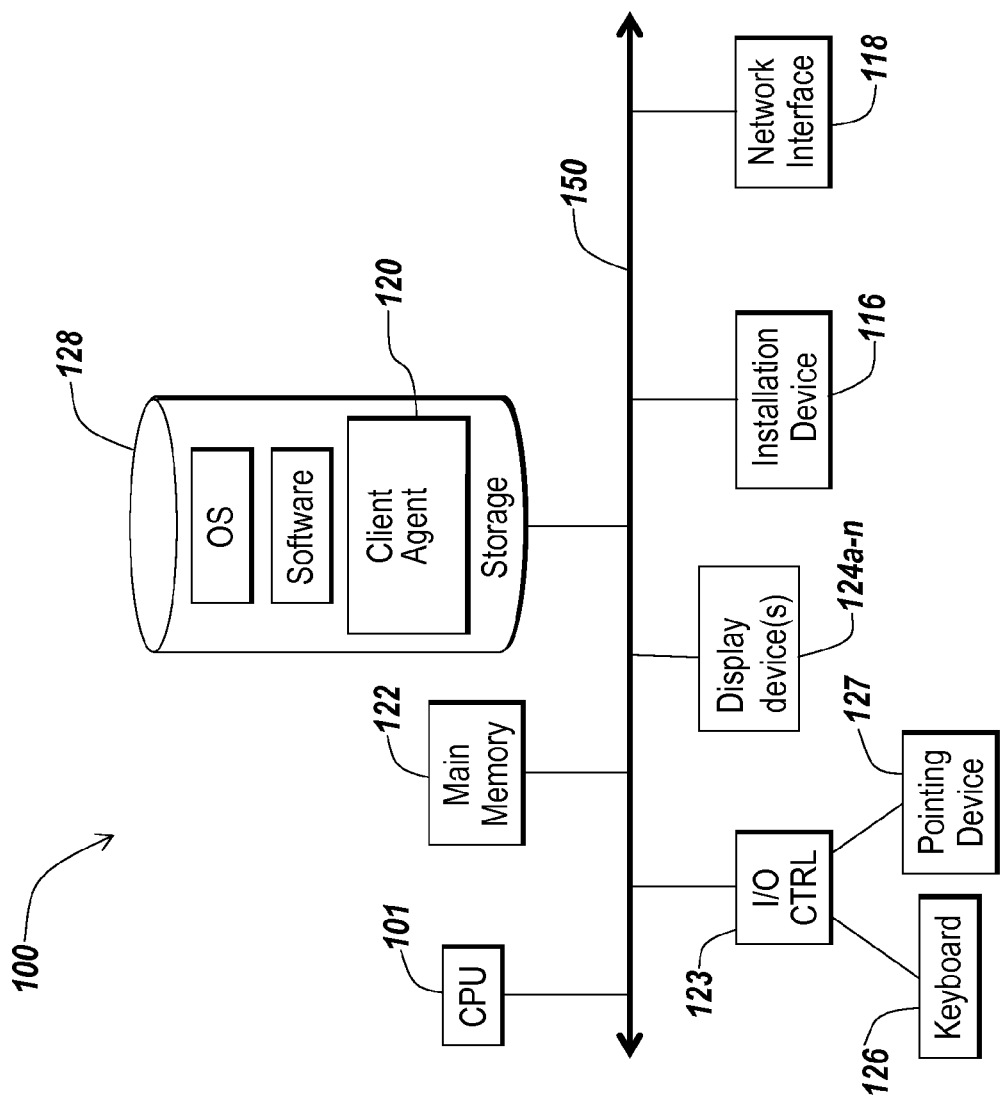
FIGS. 1E and 1F are block diagrams of embodiments of a computing device.
Figure 1F:
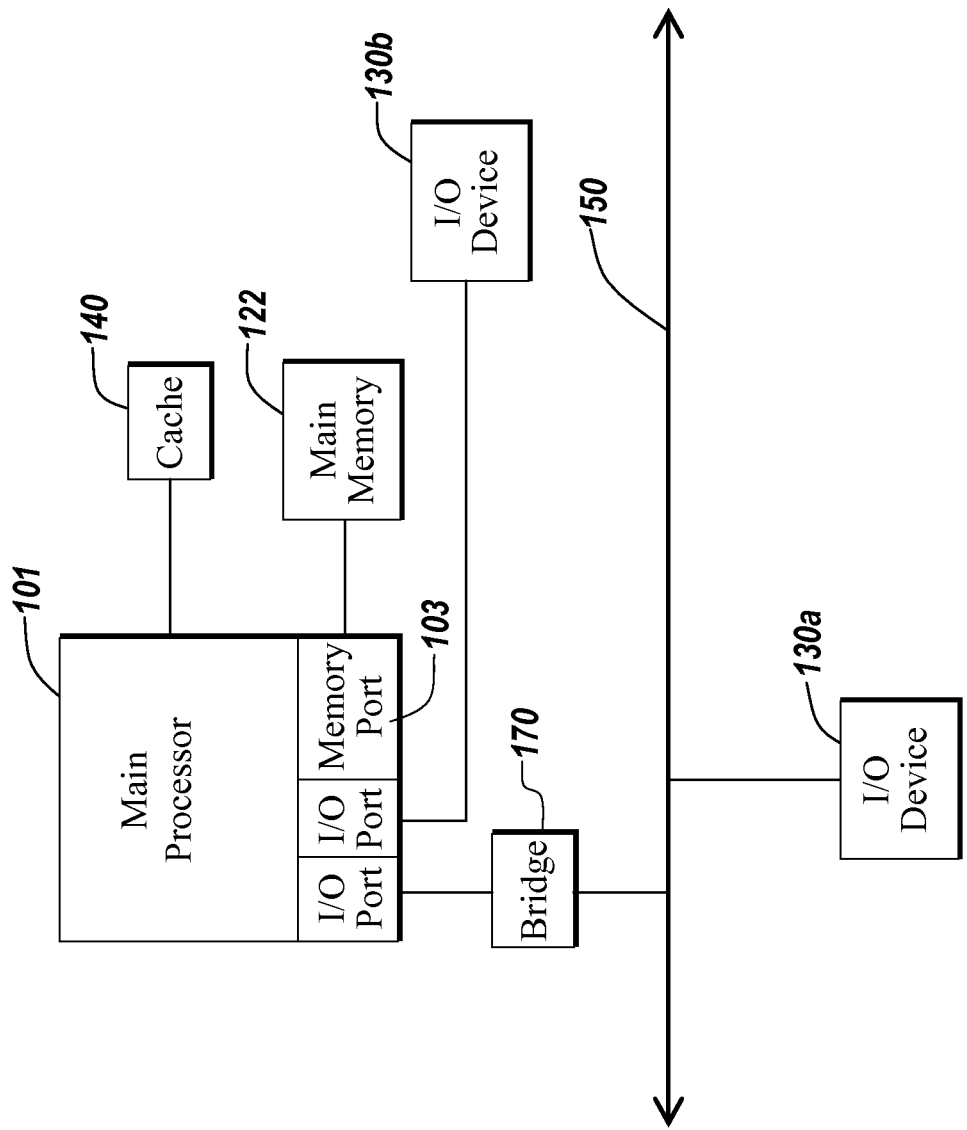

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1E depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1E, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130 via HyperTransport, Rapid I/O, or InfiniBand. FIG. 1F also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
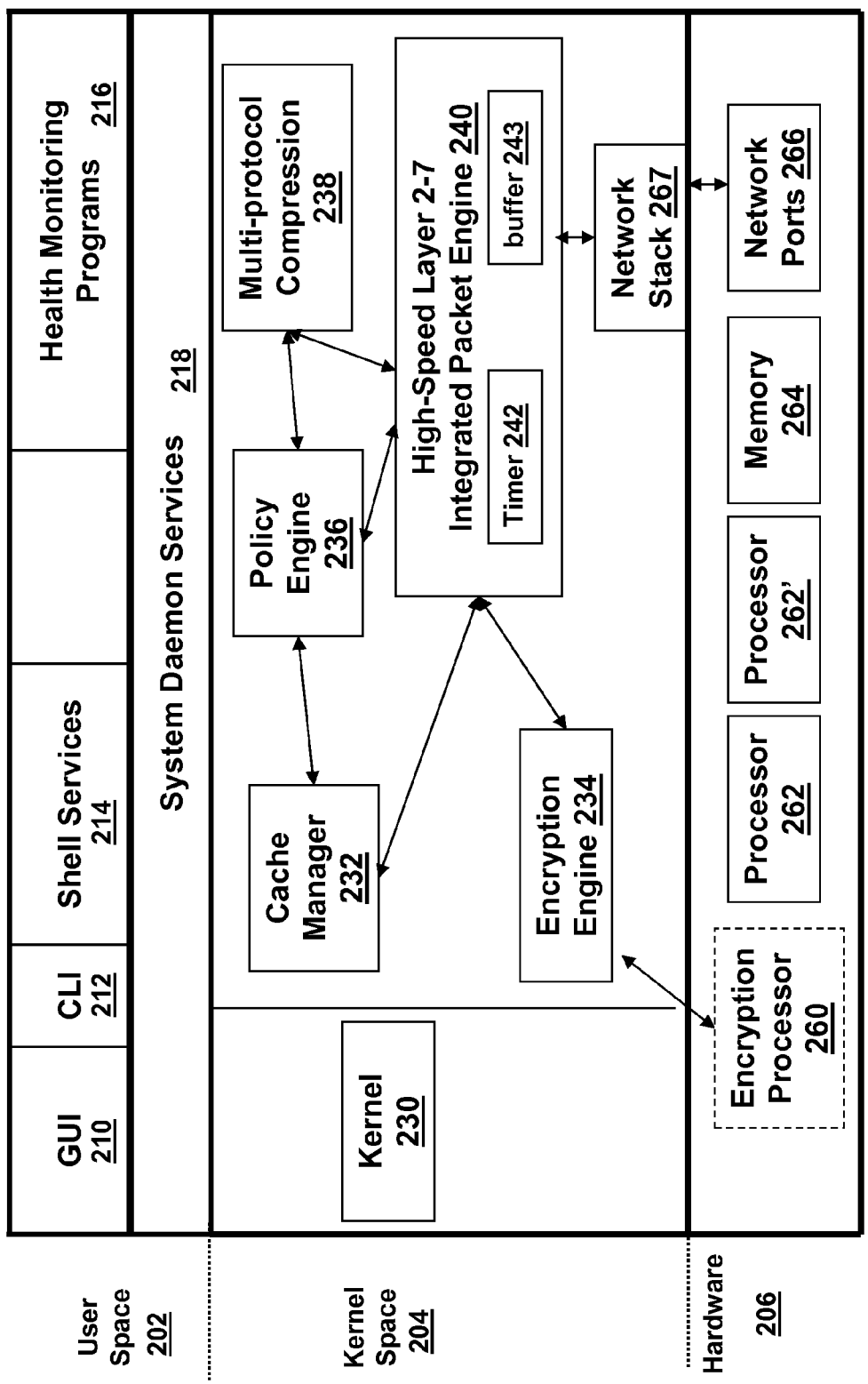
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of UNIX operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any realtime operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2A, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element nat comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

Figure 2B:
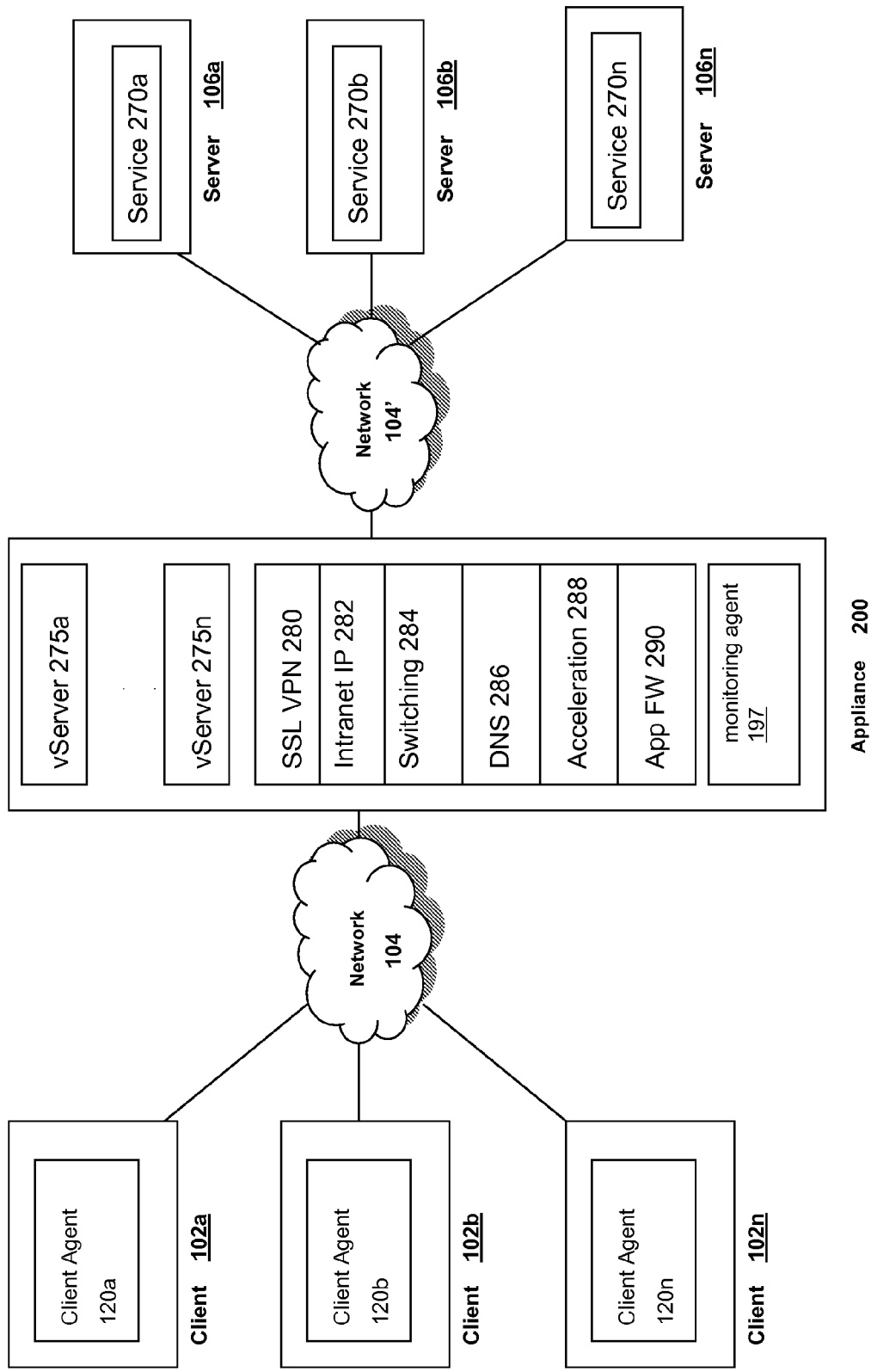
FIG. 2B is a block diagram of another embodiment of an appliance for optimizing, accelerating, load-balancing and routing communications between a client and a server.

In some embodiments, the policy engine 236 may provide a configuration mechanism to allow a user to identify, specify, define or configure policies directing behavior of any other components or functionality of an appliance, including without limitation the components described in FIG. 2B such as vServers 275, VPN functions 280, Intranet IP functions 282, switching functions 284, DNS functions 286, acceleration functions 288, application firewall functions 290, and monitoring agents 197. In other embodiments, the policy engine 236 may check, evaluate, implement, or otherwise act in response to any configured policies, and may also direct the operation of one or more appliance functions in response to a policy.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packer. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer 275, vS 275, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL, VPN 280, switching/load balancing 284, Domain Name Service resolution 286, acceleration 288 and an application firewall 290. In some embodiments, the vServer 275, or the vS, establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vS 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, where n can be any number or symbol, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or IntranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching.

In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In one embodiment, the appliance 200 receives the monitoring agent 197 from the monitoring service 1908 or monitoring server 106 as depicted in FIG. 1D. In some embodiments, the appliance 200 stores the monitoring agent 197 in storage, such as disk, for delivery to any client or server in communication with the appliance 200. For example, in one embodiment, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In one embodiment, the appliance 200 transmits the monitoring agent 197 to a second appliance 200' or appliance 205.

In other embodiments, the appliance 200 executes the monitoring agent 197. In one embodiment, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In one embodiment, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
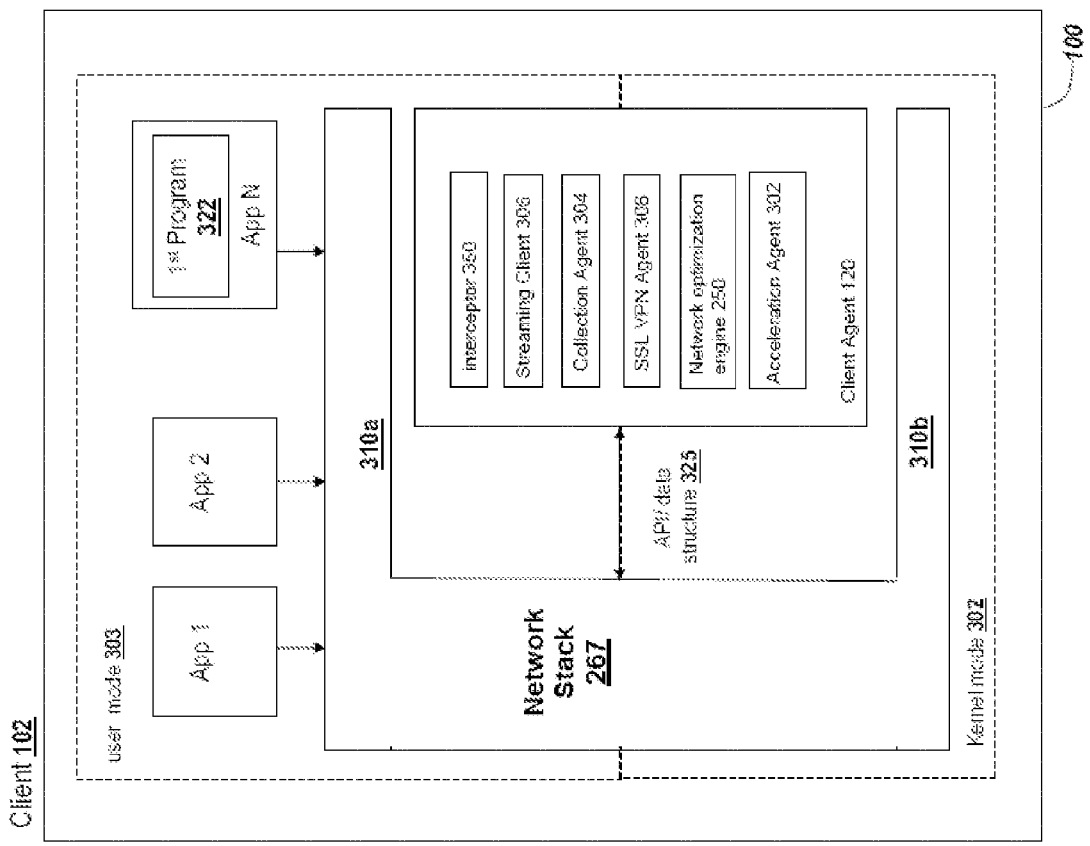
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a min-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In one embodiment, the monitoring agent 129 monitors and measures performance of any portion of the client agent 120. For example, in some embodiments, the monitoring agent 129 monitors and measures performance of the acceleration program 302. In another embodiment, the monitoring agent 129 monitors and measures performance of the streaming client 306. In other embodiments, the monitoring agent 129 monitors and measures performance of the collection agent 304. In still another embodiment, the monitoring agent 129 monitors and measures performance of the interceptor 350. In some embodiments, the monitoring agent 129 monitors and measures any resource of the client 102, such as memory, CPU and disk.

The monitoring agent 197 may monitor and measure performance of any application of the client. In one embodiment, the monitoring agent 129 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In one embodiment, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. Load Balancing with Metrics Selected by a User from Appliance Determined Metrics and/or Metrics Collected from a Device Via a Network Management Protocol Referring now to FIG. 4, various features from a plurality of embodiments of a system for load balancing are depicted. The load balancing may be based on metrics determined by the appliance 200 and/or metrics collected by the appliance from a device or service via a network management protocol, such as a Simple Network Management Protocol (SNMP). The appliance provides a load monitor to monitor the load of one or more services 270A-270N. In one embodiment, a user may configure one or more load monitors based on metrics selected from a custom metric table which includes metrics or objects obtains via a network management protocol query. In another embodiment, a user may configure one or more load monitors based on metrics or parameters collected by the appliance. In some embodiments, the user configures one or more load monitors based on metrics selected from the custom metric table and the appliance collected metrics. In response to the user's selection, the appliance determines the load of the one or more services and load balances client requests to the services using any type of load balancing technique.

Figure 4:
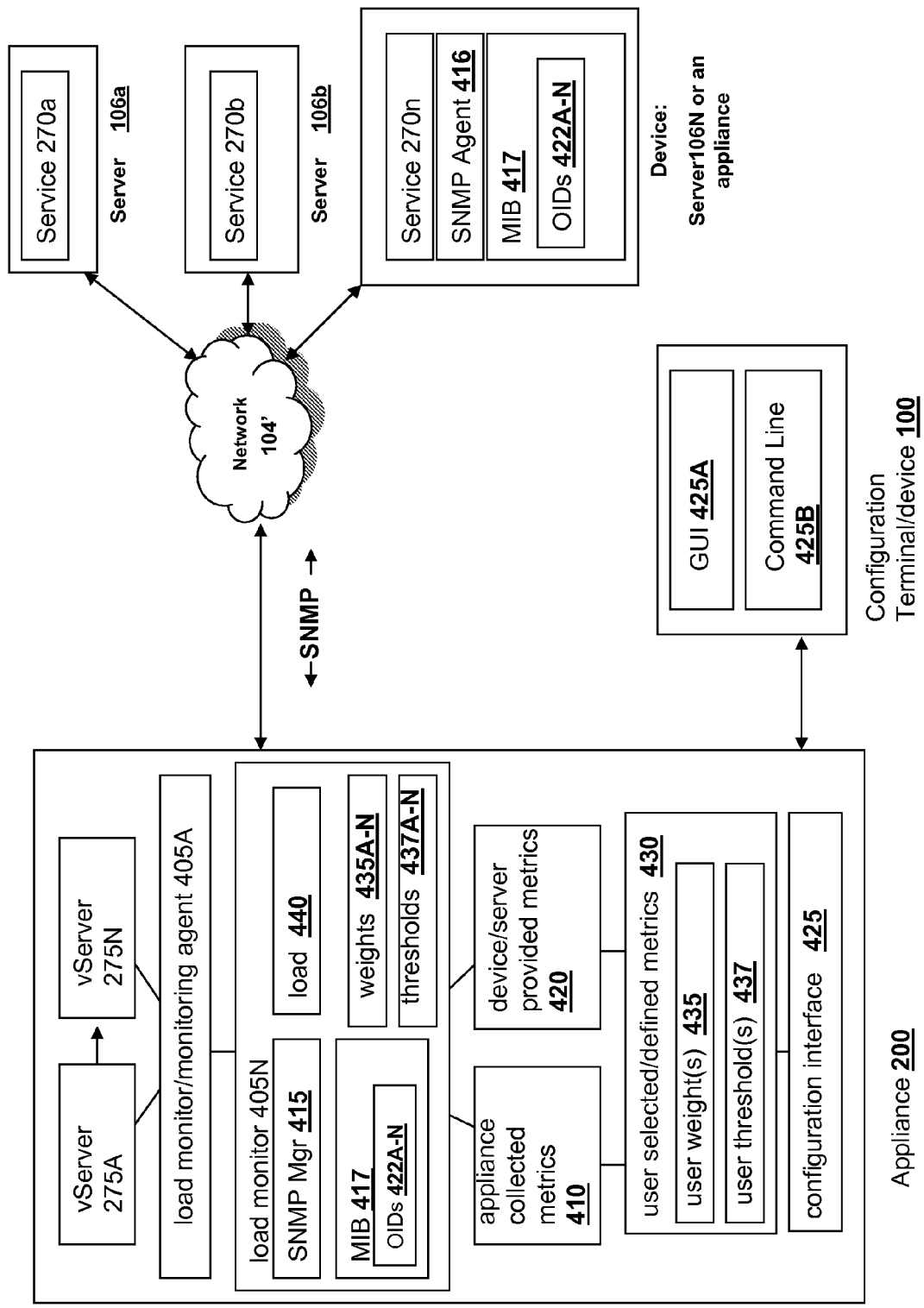
FIG. 4 is a block diagram of an embodiment of an appliance for collecting metrics via a network management protocol and for determining a load of services based on user selected metrics.

Referring further to FIG. 4, an embodiment of an appliance for load balancing one or more services is depicted. In brief overview, an appliance 200 has one or more virtual servers, also referred to as vServers, configured to provide load balancing 284 to one or more services 270a-270n deployed on or provided by one or more servers 106a-106b. A vServer 275A is associated with, configured to or bound to a service 270A or a group of services 270A-270N.

The appliance 200 has one or more load monitors 405A-405N to monitor a status, operation, and/or performance of the services 270A-270N. A load monitor is associated with, configured to or bound to a service 270A or a group of services 270A-270N. The load monitors 405A-405B provide information to the vServers 275A-275N to determine which of the services 270A-270N should receive a request received by a vServer 275. A load monitor 405 and/or vServer 275 may use appliance collected metrics 410 and/or device provided metrics 420 to determine a load across a plurality of services 270A-270N and to load balance incoming client requests. The appliance 200 also includes a configuration interface 435 to receive information identifying user selected or user defined metrics 430 to be used by the load monitors 405 and/or vServers 275 for load balancing the plurality of services 270A-270N.

The appliance 200 may include any type and form of load monitor 405A-405N, also referred to as monitoring agent, for monitoring any operational or performance characteristic or metric of a service 270, server 106 or device 100. A load monitor 405 may include software, hardware, or any combination of software and hardware. The load monitor 405 may include any application, program, script, service, daemon, process, task, thread or set of executable instructions. In one embodiment, the load monitor 405 operates or executes in kernel space of the appliance 200. In another embodiment, the load monitor 405 operates or executes in user or application space of the appliance 200. In some embodiments, a first portion of the load monitor 405 operates in kernel space while a second portion of the load monitor 405 operates in application layer or space of the appliance 200.

In one embodiment, the load monitor 405 communicates with a service 270 once. In some embodiments, the load monitor 405 monitors or communicates with a service 270 on a predetermined frequency, such as every 1 msec or 1 sec. A user may configure or specify the predetermined frequency via the configuration interface 425. In other cases, another appliance or system may configure or specify the predetermined frequency via the configuration interface 425. In yet another embodiment, the load monitor 405 monitors or communicates with a service 270 responsive to one or more events, such as receipt of a request, response or a network packet. In one embodiment, a load monitor 405 monitors or communicates with a service 270 responsive to one or more policies of a policy engine.

In some embodiments, a load monitor 405 may use a request/reply messaging mechanism or protocol with the service 270 or server 106. In other embodiments, a load monitor 405 may have a custom or proprietary exchange protocol for communicating with a service, server or device. In one embodiment, a load monitor 405 may use the protocol of the service 270 to monitor or communicate with the service 270. As such, in some embodiments, the load monitor 405 uses the HTTP protocol to monitor or communicate with a web service 270A or an FTP protocol for an FTP server 270B. In yet other embodiments, the load monitor 405 uses a TCP or ICMP protocol for monitoring a service 270. In some embodiments, the load monitor 405 uses a network management protocol to monitor or query a status or metric of a service, server or device. In one embodiment, the load monitor 405 uses a Simple Network Management Protocol (SNMP). In another embodiment, the load monitor 405 uses a common management information protocol (CIMP).

In some embodiments, a single load monitor 405 monitors a plurality of services 270A-270N, or servers 106A-106B. In other embodiments, a plurality of load monitors 405A-405N monitor a single service 270A or server 106A. In still other embodiments, multiple load monitors 405 may each monitor a plurality of services 270A-270N, or servers 106A-106N. In one embodiment, multiple load monitors 405 may each monitor a service 270. In yet another embodiment, a load monitor 405A may monitor one or more other load monitors 405B-405N.

In some embodiments, the one or more load monitors 405 are associated with one or more services 270. In one embodiment, a user specifies or configures a load monitor 405 for one or more service 270 via the configuration interface 425. For example, a user via the configuration interface 435 may issue a command to bind the monitor 405 to a service 270. In other embodiments, the load monitor 405 is associated with a vServer 275, also referred to vS 275. In one embodiment, a user specifies or configures via the configuration interface 425 a load monitor 405 for a vServer 275. In yet another embodiment, a use specifies or configures via the configuration interface 425 a vServer 275 for one or more services 270A-270N. For example, a user may bind a vServer 275 to a service 270.

In some embodiments, the one or more load monitors 405 may monitor an appliance 200, vServer 275, network service 270, client 102, server 106, device 100 or any other network resource. In one embodiment, a user specifies a type of network service to associate with the one or more monitoring agents 405. In another embodiment, a user customizes a monitoring agent. For example, a user may implement or otherwise provide a script for monitoring a service. In still another embodiment, a generic monitoring agent 405 is used. In some embodiments, a monitor agent 405 is configurable to use a predetermined monitor, script or status message based on a type of protocol or type of service In yet another embodiment, the one or more monitoring agents 405 determine the response time of the one or more network services 270 for responding to a request of one of the following types: ping, transport control protocol (tcp), tcp extended content verification, hypertext transfer protocol (http), http extended content verification, hypertext transfer protocol secure (https), https extended content verification, user datagram protocol, domain name service, and file transfer protocol. In some embodiment, a monitoring agent 405 checks for predetermined status codes in responses from the service 270. In other embodiments, the monitoring agent 405 checks for predetermined string patters in response from the service 270.

In some embodiments, the one or more load monitors or monitoring agents 405 are protocol-specific agents. For example, an agent 405 may determine availability for a network service of a particular protocol-type. In some embodiments, a monitoring agent 405 determines a response time of a server 106 or network service 270 to a TCP request. In one of these embodiments, the agent uses a "TCP/ICMP echo request" command to send a datagram to the network service 270, receive a datagram from the network service 270 in response, and determine a response time based on the roundtrip time of the datagram. In another of these embodiments, the monitoring agent 405 verifies that the response from the network service 270 included expected content. In one embodiment, the monitoring agent 405 verifies that the response did not include an error.

In other embodiments, a monitoring agent 405 determines availability of a network service 270 to a UDP request. In one of these embodiments, the agent uses a "UDP echo" command to send a datagram to the network service 270, receive a datagram from the network service 270 in response, and determine a response time based on the roundtrip time of the datagram. In another of these embodiments, the monitoring agent 405 verifies that the response from the network service 270 included expected content and did not contain errors.

In still other embodiments, the monitoring agent 405 determines availability of a network service 270 to an FTP request. In one of these embodiments, the monitoring agent 405 sends an FTP command, such as a "get" command or a "put" command, to the network service 270 and determines a time needed by the network service 270 to respond to the command. In another of these embodiments, the monitoring agent 405 verifies that the response from the network service 270 included expected content, such as contents of a file requested by a "get" command, and did not contain errors.

In yet other embodiments, the monitoring agent 405 determines availability of a network service 270 to an HTTP request. In one of these embodiments, the monitoring agent 405 sends an HTTP command, such as a "get" request for a uniform resource locator (URL) or a file, to the network service 270 and determines a time needed by the network service 270 to respond to the request. In another of these embodiments, the monitoring agent 405 verifies that the response from the network service 270 included expected content, such as the content of a web page identified by a URL. In some embodiment, the monitor agent 405 checks for a predetermined status code. In other embodiments, the monitoring agent 405 checks for a predetermine string pattern in an HTTP response.

In further embodiments, the monitoring agent 405 determines availability of a network service 270 to a DNS request. In one of these embodiments, the monitoring agent 405 sends a DNS request, such as a dnsquery or nslookup for a known network address, to the server 106 or network service 270 and determines a time needed by the server 106 or network service 270 to respond to the request. In another of these embodiments, the monitoring agent 405 verifies that the response from the network service 270 included expected content, such as the domain name of a computing device 100 associated with the known network address. In one embodiment, monitoring agent 405 verifies the response did not have an error.

In some embodiments, the appliance 200 via a monitoring agent 405 identifies and collects metrics 410 based on network traffic and information traversing the appliance, or otherwise referred to as appliance collected parameters or metrics. The appliance 200 or agent 405 may store the appliance collected metrics 410 in any type and form of data storage mechanism in memory and/or disk storage. In one embodiment, the appliance stores the metrics 410 in a table. In another embodiment, the appliance stores the metrics 410 in a database. In yet another embodiment, the appliance stores the metrics 410 in an object or data structure. In still other embodiments, the appliance 200 stores appliance collected metrics 410 in multiple tables and/or data storage mechanisms. In one embodiments, the appliance collected metrics 410 may be arranged or organized in any manner in the multiple tables.

In some embodiments, the monitoring agent 405 determines one or more metrics 410 from network packets received and transmitted by the appliance. In one embodiment, the monitoring agent 405 determines a number and/or type of connections to one or more services 270 or server 106. In another embodiment, the monitoring agent 405 determines a number of packets transmitted to a service 270 or server 106. In other embodiments, the monitoring agents 405 determines a number of packets received from or transmitted by a service 270 or server 106. In some embodiments, the monitoring agent 405 determines a response time from a service 270 or service. In one embodiments, the monitoring agent 405 determines an average response time. In another embodiment, the monitoring agent 405 determines a number or percentage of loss packets. In other embodiments, the monitoring agent 405 determines a number of errors received from a service or server.

In some embodiments, the monitoring agent 405 determines a bandwidth of a connection to a service 270 or a server 106. In one embodiment, the monitoring agent 405 determines the bandwidth of a connection based on a response time and/or packet loss. In another embodiment, the monitoring agent 405 determines the bandwidth of a connection based on a number of bytes transferred or communicated to and/or form a service 270 or server 106. In one embodiment, the monitoring agent 405 determines the bandwidth based on a number of bytes received from a service or server over a predetermined time period, such as per second. In another embodiment, the monitoring agent 405 determines the bandwidth based on a number of bytes transmitted to a service or server over a predetermined time period. In some embodiments, the monitoring agent 405 determines the bandwidth based on a number of bytes transmitted to and received from a service or server over a predetermined time period.

In some embodiments, the appliance 200 via a monitoring agent 405 identifies and collects metrics 430 provided by a service, server or device. These metrics 430 may also be referred to as custom metrics or a custom metric table. The appliance 200 or agent 405 may store the service or device collected metrics 430 in any type and form of data storage mechanism in memory and/or disk storage. In one embodiment, the appliance stores the metrics 430 in a table. In another embodiment, the appliance stores the metrics 430 in a database. In yet another embodiment, the appliance stores the metrics 430 in an object or data structure. In some embodiments, the appliance stores the metrics 430 in the same data storage mechanism as the appliance collected metrics 410. In other embodiments, the appliance stores the metrics 430 in a different storage mechanism as the appliance collected metrics 410. In still other embodiments, the appliance 200 stores device provided metrics 420 in multiple tables and/or data storage mechanisms. In one embodiments, the device provided metrics 420 may be arranged or organized in any manner in the multiple tables. For example, the appliance 200 may maintain a metrics table 420 for each service, device or application.

In one embodiment, the load monitor 405 uses a network management protocol, such as SNMP, to query a server or device for one or more objects identifiers and data for the objects of the object identifiers. By way of example only and not in any way limiting, the load monitor 405 uses an SNMP architecture to provide management information bases (MIBs) 417, which specify management data of a device or device subsystem, such as a service 270, using a hierarchical namespace containing object identifiers 422A-422N for managed objects. In some embodiments, a MIB 417 is a collection of information that is organized hierarchically. MIBs 417 may be accessed using a network-management protocol such as SNMP. An MIB 417 includes managed objects identified by object identifiers 422A-422N. In one embodiment, a managed object (sometimes called a MIB object, an object, or a MIB) is one of any number of characteristics or metrics of a managed device, appliance or system. In some embodiments, a managed objects includes one or more object instances, which correspond to or referred to as variables.

In one embodiment, the MIB 417 hierarchy may be depicted as a tree with a nameless root, the levels of which are assigned by different organizations. In some embodiments, the top-level MIB object IDs may belong to different standards organizations, while lower-level object IDs are allocated by associated organizations. The MIB 417 and/or objects 422A-422N may be arranged, constructed or organized for management across any of layers of the OSI reference model. In some embodiments, the MIB 417 and/or objects 422A-422N provide managed data and information on applications such as databases, email, and web services. Furthermore, the MIB 417 and/or objects 422A-422N may define for any area-specific or appliance specification information and operations, such as for any type of service 270, server 106 or device 100 load balanced or managed by the appliance 200.

In the example embodiment of SNMP, the SNMP communication model is based on a manager 415 and an agent 416 with a data of management information 417 and management objects 422A-422N. In one embodiment, the manager 415 provides an interface between appliance and the managed system. The agent 416 provides the interface between the manager 415 and the device, system, application, component, element or resource being managed. As illustrated in FIG. 4, the appliance 200 may include a manager 415 which requests and obtains object identifiers and values from an agent 416, such as the agent 416 on a server 106. In the example of SNMP, a manager 415 communicates a GET or GET-NEXT message to request information for a specific object. The agent 416, in response to the manger's request, issues a GET-RESPONSE message to the manager 415 with the information requested or an error message. The manager 415 may transmit a SET message to request a change to a value of a specific variable or object 422. The agent 416 may issue a TRAP message to inform the manager 415 of an event, such as an alarm or error on a service 270.

Although generally described in an embodiment of an SNMP network management protocol, the appliance 200 and/or load monitor 405 may use any type and form of network management protocol and communication model to obtain identifiers and values of information, such as objects or variables, from another device for a managed system, subsystem or service 270. For example, the appliance 200 may use any of the following protocols and/or communication models: Remote monitoring (RMON), AgentX, Simple Gateway Monitoring Protocol (SGMP), Common management information protocol (CMIP), Common management information service (CMIS) or CMIP over TCP/IP (CMOT).

Furthermore, although a MIB 417 is generally described in reference to a manager/agent communication model for an example network management protocol such as SNMP, the MIB 417 may include any type and form of data storage of object identifiers, variables, parameters or other identifiers of metrics. The MIB 417 may be either protocol dependent or protocol independent. For example, the MIB 417 may comprise a table of metrics for a device or service that can be queried via any type and form of API.

The managed objects or variables provided via the network management protocol may provide any type and form of metrics or operational characteristics of the service, server or device to be used by the appliance for load balancing, or any other function of the appliance 200. In one embodiment, the device provided metrics 420 may include any of the metrics 410 collected by the appliance as described above. In another embodiment, the device provided metrics 420 may include any type and form of information on any resource usage of the managed device, service or system. In one embodiment, the metrics 410 include CPU, memory and/or disk usage of the device and/or service 270. In other embodiments, the metrics 420 may include information on a number of connections, sessions or clients of the service 270. In some embodiments, the metrics 420 include any information on any thresholds of the service 270 or server 106, such as a threshold identifying a maximum number of sessions or clients. In yet another embodiment, the metrics 420 include any information on a type of protocol of the service 270. In other embodiments, the metrics 420 include any information on any alarms or errors of the service 270.

In some embodiments, each load monitor 405 includes the appliance collected metrics 410. For example, the metric table 410 may be implicitly bound to each monitor 405 by default. In other embodiments, a user associates or binds a custom metric table 420 to a monitor 405. In yet another embodiment, a user associates or binds a custom metric table 420 and appliance collected table 410 to a monitor 405. In yet other embodiments, a user may associate or bind any combination of one or more appliance collected metric tables 410 and custom metric tables 420 to one or more load monitors 405.

In some embodiments, a user via the configuration interface 425 may configure or specify for a load monitor 405 one or more object identifiers 422A-422N to obtain values for and store in the metrics 420. For example, the user may specify a user-defined metric 430. In other embodiments, the appliance 200 or load monitor 405 obtains a list of one or more object identifiers 422A-422N from a device 100, such as server 106 or service 270. In yet another embodiment, the appliance 200 includes one or more metric tables 420 with predetermined OIDS 422A-422N for a known device. For example, the appliance 200 may include a metric table 420 for any one or more of the following appliances or devices: 1) any version of the NetScaler device manufactured by Citrix Systems, Inc. of Ft. Lauderdale, Fla.; 2) any of the appliances, such as BIGIP or WebAccelerator, manufactured by F5 Networks, Inc. of Seattle, Wash.; 3) any of the AppDirector or AppXcel devices manufactured by Radware Ltd of Mahwah, N.J.; 4) any application acceleration and/or security related appliances and/or software manufactured by Cisco Systems, Inc. of San Jose, Calif.

The appliance 200, vServer 275 and/or load monitor 405 computes, calculates or otherwise determines a load 440 for each service 270 based on any of the metrics from the appliance collected metrics 410 and/or device provided metrics 420. The appliance 200 may use a weight 435A-435N and a threshold 437A-437N for each of the metrics used in the determination of the load 440. In one embodiment, the appliance 200 establishes a weight 435 and/or a threshold 437. In other embodiments, a user establishes a weight 435 and/or a threshold 437. For example, in some cases, if a user does not specify a weight for a plurality of metrics, the appliance equally weights each metric. In one example embodiment, the appliance 200 determines the load 440 for each service as follows:

$$\text{Sum(weight of metric/established ceiling value of metric)}*(\text{obtained value of metric/established ceiling value of metric})/\text{Sum(weights)})$$

In some embodiments, a metric value may be based on a range of 0-100, or absolute range. In other embodiments, a metric value may not be based on a range of 0-100 or is otherwise relative to the type of metric and possible range of values. For example, a metric identifying a number of connections may have a ceiling or predetermined maximum value of 10,000. In one of these embodiments, the appliance establishes a ceiling value or predetermined upper limit for the metric value. In another of these embodiments, a user via the configuration interface 425 establishes a ceiling value or predetermined upper limit for the metric value. In further embodiments, the established ceiling value may comprise a value less than the actual maximum value for the metric or upper limit of the range value. For example, a user may specify or configure a relative range value based on a desired operational or performance range of a metric.

In some embodiments, if a metric of a service exceeds a user or appliance provided threshold, the service may be excluded from the load determination or otherwise from a load balancing decision. In other embodiments, if all the metrics of a service exceeds their corresponding thresholds, the service may be excluded from the load determination or otherwise from a load balancing decisions. In yet another embodiment, even if a service exceeds the threshold(s) for one or more of the metrics, the service may be considered in the load determination or otherwise for load selection. In some cases, a client session may be identified as persistent or sticky to a vServer 275 or service 270. In these cases, if a request for the client's sessions is received by the appliance, the appliance may provide the request to a vServer 275 or service 270 although a metric for the vServer or service has been exceeded.

In still other embodiments, if a threshold of a metric of a service or virtual server has been exceeded, the appliance may, in response to the threshold being exceeded, redirect the client making the request to another resource. In one embodiment, the appliance may transmit a URL to the client comprising the address of a server 106 or service 270 such that the client may bypass the appliance 200 and access the server 106 or service 270 directly. In one embodiment, the appliance may transmit a URL to the client comprising the address of a second appliance 200 or another device. In still another embodiment, the appliance 200 may redirect the client request to a second appliance, device, service or server on behalf of the client.

In some embodiments, if a threshold of a metric of a service or virtual server has been exceeded, the appliance may, in response to the threshold being exceeded direct a client request to a second virtual server or service. In one embodiment, a second virtual server may be a backup to a primary virtual server. Upon detection of the threshold being exceeded, the appliance may spillover requests and connections to a second virtual server.

Although the load 440 is generally discussed in view of the above equation, the appliance may use any type and form of load calculation, weighted or not weighted. In some embodiments, the appliance 200 determines the load using an average of metric values. In other embodiments, the appliance 200 determines the load 440 using any derivative value of a metric. In another embodiment, the appliance 200 determines the load 440 using any statistical measure of a metric. In still another embodiment, the appliance 200 determines the load 440 using any function or computation of a metric. In yet other embodiments, the appliance 200 may determine a load 440 for each metric. In these embodiments, the appliance 200 may aggregate, compare or otherwise compute an load 440 based on any type and form of aggregation of a metric's contribution to a load of a service.

In some embodiments, a user configures multiple monitors 405 for a service 270. In these embodiments, the load 440 on the service 270 is a sum of the load of all the monitors. In one embodiment, the sum of the load from multiple monitors 440 is weighted. The appliance may assign a monitoring 405 a weight. A weight may comprise an integer, decimal, or any other numeric indicator. In some embodiments, a user may configure via the configuration interface 425 the weight corresponding to a monitor 405. In some embodiments, all monitors 405 may be assigned equal weight. In other embodiments, a plurality of monitors 405 may each be assigned different weights. The weights may be assigned to the monitors based on any criteria indicating relative importance, including without limitation the appliance or user determination of the relative importance or value of the monitor in view of the service, reliability of the monitoring mechanism, and the frequency of monitoring.

In one embodiment, a monitoring agent 405 may be assigned a weight based on the relative importance of the service monitored by the appliance. For example, if most user requests in an environment are HTTP requests, a monitoring agent monitoring HTTP availability of a server 106 might be assigned a weight of 10, while a monitoring agent monitoring FTP availability of a server 106 might be assigned a weight of 3. Or, for example, if an administrator placed a high priority on UDP applications, a monitoring agent monitoring UDP availability of a server may be assigned a weight of 20, while a DNS monitoring agent may be assigned a weight of 5.

In some embodiments, an appliance 200 may compute a sum of the weights of the monitoring agents currently reporting a network service 270 as operational. For example, if five monitoring agents, each assigned a weight of 30, are monitoring a network service 270, and three of the five monitoring agents report the network service 270 as available, the appliance may determine the sum of the monitoring agents currently reporting the network service 270 as operational to be 90. Or for example, if only two monitoring agents, one with a weight of 20 and the other with a weight of 40, are reporting a server 106 as available, the appliance may compute the sum of the monitoring agents currently reporting a server 106 as operational to be 60.

The appliance 200 also includes a configuration interface 425 providing any type and form of interface mechanism for a user, application or system to communicate with the appliance 200. In one embodiment, the configuration interface 425 includes a command line interface 425B. In another embodiment, the configuration interface 425 includes a graphical user interface 425A. In some embodiments, the configuration interface 425 includes an application programming interface (API) or development toolkit for an application, program or script to communicate with the appliance 200.

In some embodiments, the appliance 200 displays the configuration interface 425 via a display of the appliance. In other embodiments, a configuration terminal or device 100 connects to or communicates with the appliance 200 and displays the configuration interface 425. For example, the configuration device 100 or terminal may connect to the appliance 200 via a port and IP address of the appliance 200. The appliance 200 may provide a web service listening on the port and IP address to serve a page to the user. The served page may provide a user interface for configuring the appliance 200. In other embodiments, the configuration terminal 100 may connect and communicate with the appliance 200 via any type and form of connection, including a monitor port, serial port or USB connection.

Via the configuration interface 425, the appliance 200 may receive information identifying user selected metrics 430 to use in determining the load 440 for one or more services. In one embodiment, the user identifies or selects a metric from a plurality of appliance collected metrics 410. In another embodiment, the user identifies or selects a metric from a plurality of device provided metrics 420. In some embodiments, the user selects one or more metrics from the appliance collected metrics 510 and one or more metrics from the device provided metrics 410. The appliance 200 may also receive via the configuration interface 425 information identifying a user's selection or designation of a weight 435 for a metric. For example, a user may provide a value of a weight 435 for a metric. In some embodiments, the appliance 200 receives information identifying a user provided value for a threshold 437.

In operation, the appliance 200 may use user selected metrics 430 and user provided weights 435 and thresholds 437 for determining the load 440. In another embodiment, the appliance may use any appliance established metrics from the appliance collected metrics 410 for determining the load. In one embodiment, a user establishes a weight and/or a threshold for an appliance provided metric. So although the metric may not be user selected in some embodiments, the user may control or configure the weights 435 and/or thresholds 437 for the metrics 410. In other embodiments, the appliance may use any combination of user selected metrics 430 and appliance established metrics 410 for determining the load. In another embodiment, the appliance 200 may use any combination of user provided weights 435 and/or thresholds 437 and appliance provided weights 435 and/or thresholds 437 for any metric used for determining the load 440.

E. Global Server Load Balancing Among Heterogeneous Device

Figure 5A:
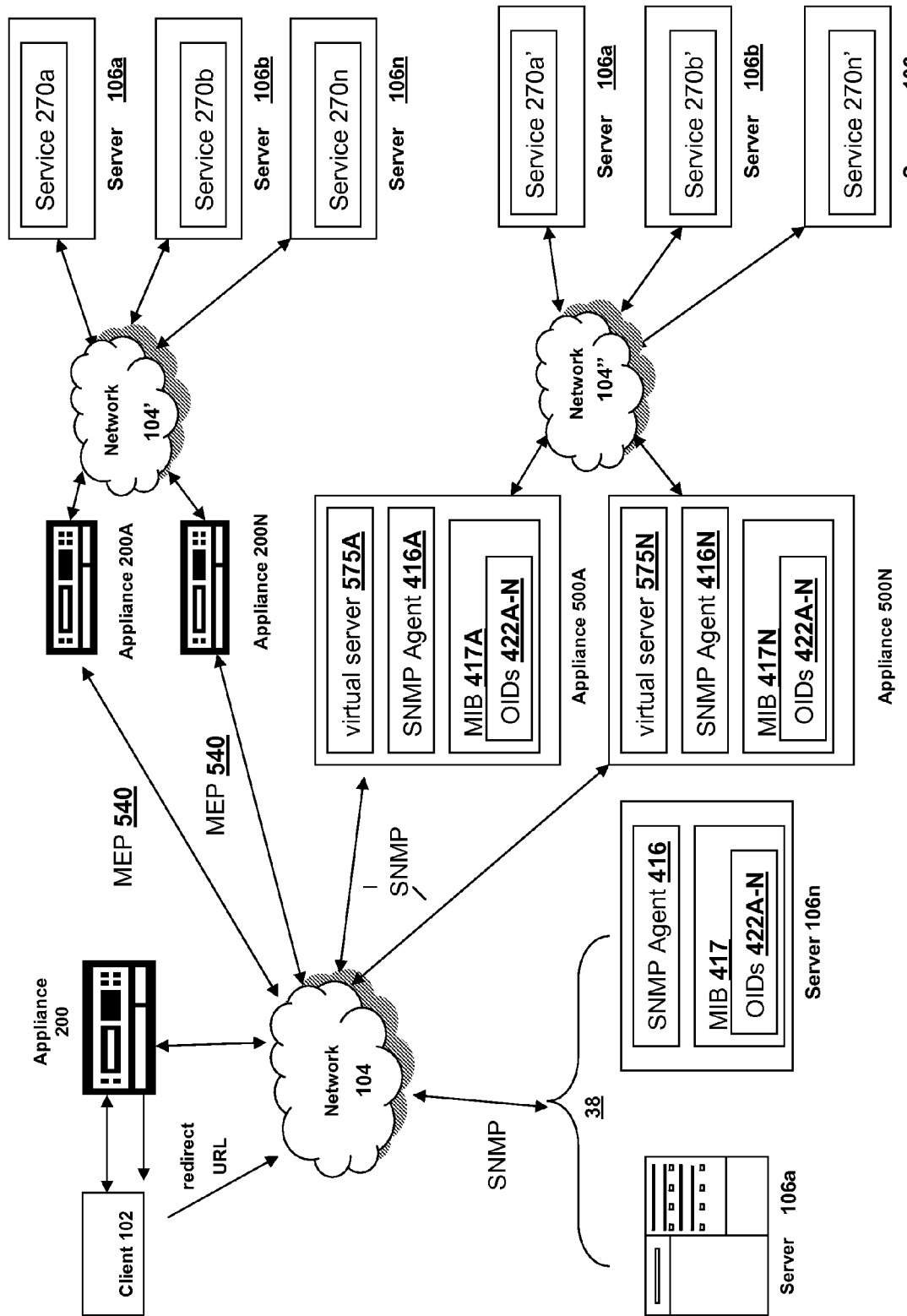
FIG. 5A is a block diagram of an embodiment of a network environment for performing global server load balancing among heterogeneous devices.
Figure 5B:
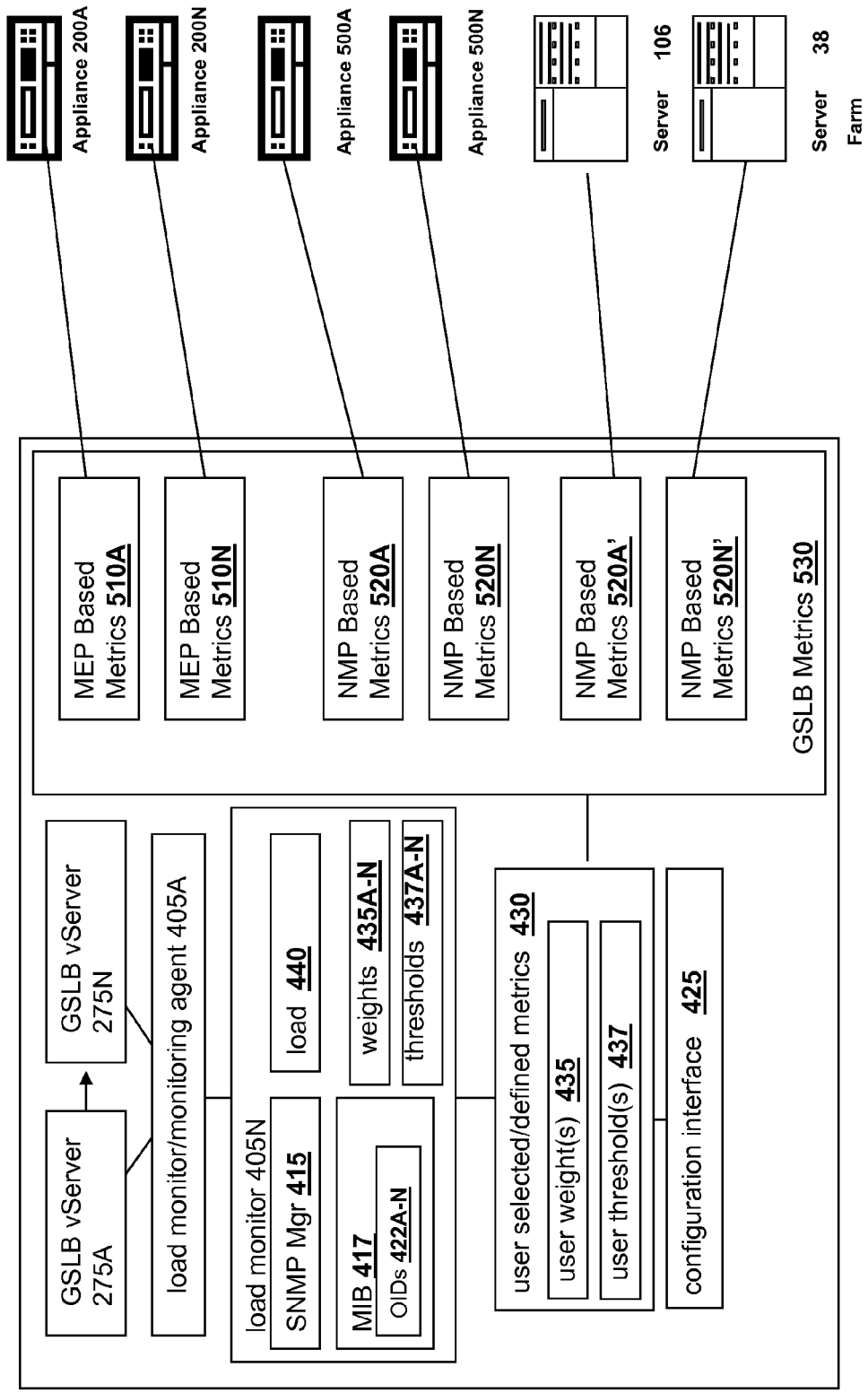
FIG. 5B is a block diagram of an embodiment of an appliance performing server load balancing among heterogeneous devices.

Referring now to FIG. 5A and FIG. 5B, systems for load balancing a plurality of heterogeneous devices are depicted. The appliance 200 described herein may be deployed to load balance a plurality of services and load balancing devices. A first appliance 200 may communicate with a second appliance 200A of the same type via a predetermined metric exchange protocol (MEP). The first appliance 200 obtains via the MEP protocol metrics to use for determining a load for the second appliance 200A. Other devices of a different type than the first appliance may be deployed in the network to perform local load balancing, such as for a server farm. In some embodiments, these devices may not communicate via the MEP protocol of the first appliance 200. In some embodiments, such devices may instead provide metrics via a network management protocol, such as a Simple Network Management Protocol (SNMP). Using the techniques described in conjunction with FIG. 4, the first appliance 200 obtains metrics from these heterogeneous devices via the network management protocol. With metrics obtained via the MEP protocol from devices of the same type and metrics obtained via a network management protocol from device of a different type, the appliance 200 may uses these combined metrics to determine a load across these heterogeneous devices and to direct request to one of the devices based on the load.

Referring now to FIG. 5A, an example embodiment of a network environment for load balancing heterogeneous devices, including servers and local or other load balancing devices, is depicted. In brief overview, a network environment includes a plurality of different types of load balancing devices and servers. The appliance 200 is configured as a global load balancing device to load balance the plurality of load balancing devices and servers. Each of the load balancing devices may perform local load balancing to one or more services 270A-270N. For example, a first set of load balancing appliances 200A-200N of the same type may perform local load balancing of services or servers on a first network 104. These appliances 200A-200B may be of the same type of the global load balancing appliance 200. Or in some cases, local load balancing appliance 200A-200N are designed and constructed to communicate metrics and other information via a metric exchange protocol 540. A second type of load balancing appliances 500A-500N may perform local load balancing for one or more services 270A'-270N' on a second network 104'. These load balancing appliances 500A-500N may be of a different type than the first type of appliance 200A-200N and/or the global load balancing appliance 200. The appliance 500A-500N may operate or execute one or more virtual servers or vServers 275A-275N. Appliance 500A-500N may not be designed to communicate via the MEP protocol 540 of appliances 200-200N. Instead these appliances 500A-500N may provide metrics via a network management protocol, such as SNMP. The global load balancing appliance 200 may also perform load balancing for one or more services or servers, such as a server farm 38. Each of the servers or services may be of a different type, such as an HTTP service and an FTP service.

In view of FIG. 5A, the plurality of appliances, servers, and services may be deployed in a hierarchical fashion. The first appliance 200 may be the global load balancing appliance at the top of the hierarchy to manage a plurality of other appliances 200A-200N, 500A-500N and servers. In one case, the appliance 200 manages one or more servers 106 or service 270A-270N directly. In another case, the appliance 200 manages one or more appliances 200A-200N, 500A-500N, which in turn manages one or more servers 106 or services 270A-270N. An appliance managed by the first appliance 200 may manage a second appliance, which in turns manages one or more services or servers.

By way of example in view of various load balancing products, the global load balancing appliance 200 may be any of the product embodiments referred to as NetScaler manufactured by Citrix Systems, Inc. The appliances 200A-200N may also be a NetScaler device configured to perform local load balancing of one or more services 270A-270N. As the appliances 200A-200N are of the same type as the global load balancing appliance 200, these appliances are designed and constructed to communicate via a predetermine protocol or and/or communication model referred to as metric exchange protocol. The appliance 200A-200N may be configured to provide metric information at a predetermined frequency to appliance 200. One or more of the appliances 500A-500N may comprise another type of load balancing device, such as a BigIP load balancing device manufactured by F5 Networks, Inc. Another one or more of the appliances 500A-500N may comprise a different type of load balancing device, such as the AppDirector appliance manufactured by Radware, LTD. In some cases, one or more of the appliances 500A-500N may comprise a Cisco load balancing device. In other cases, one or more of the appliances 500A-500N may comprise a Nortel load balancing device. Any one or more of these appliances 500A-500N may not be designed or constructed to communicate with appliance 200 via the MEP protocol 540. Although the example is generally described above as Citrix NetScaler appliance 200 providing global load balancing device, any other type of load balancing device may be used.

Instead of using MEP 540, each of these different appliances 500A-500N may provide metric information via a network management protocol, such as SNMP. As illustrated in FIG. 5A, these appliances 500 may include an agent 416 for providing object identifiers 422A-422N via an MIB 417. Further to this example embodiment and as discussed in conjunction with FIG. 4, the appliance 200 using a manager/agent communication model may query any of these appliances 500A-500N via a network management protocol to identify, collect and monitor objects identified via the MIB 417. In some cases, the appliance 200 may use SNMP to communicate with one or more appliance 500A-500N. In other cases, the appliance 200 may use another type of network management protocol to communication another one or more of the appliances 500A-500N. In still another case, the appliance 200 may use a third type of network manager protocol to communicate with a further set of one or more appliances 500A-500N.

Appliances 200A-200N may be considered homogenous or the same type of appliance or device as appliance 200. In one embodiment, the appliances 200A-200N is the same product family of the appliance 200. In another embodiment, the appliance 200A-200N is a version of the same device of the appliance 200. In one case, the appliances 200 and 200A-220N are manufactured by the same company. In some embodiments, the appliances 200A-200N and appliance 200 are configured, designed and constructed to communicating using a predetermined protocol and/or communication model. In one embodiment, the appliances 200A-200N and appliance 200 are configured, designed and constructed to use a proprietary or custom protocol and/or communication model.

Appliances 500A-500N may be considered heterogonous or a different type of appliance or device as appliance 200. In some embodiments, the appliances 500A-500N are manufactured by a different company than appliance 200. In some embodiments, the appliances 500A-500N and appliance 500 are not specifically designed to communicate using a predetermined protocol and/or communication model. In one embodiment, the appliances 500A-500N and appliance 200 are not configured, designed and constructed to use a proprietary or custom protocol and/or communication model. In some cases, appliances 500A-500N use a network management protocol instead of using a proprietary protocol for providing metrics to other devices, applications or services.

Referring now to FIG. 5B, an embodiment of the appliance 200 for identifying, collecting and monitoring metrics obtained from heterogeneous network devices and servers with a plurality of protocols is depicted. The appliance 200 may have one or more virtual servers 275A-275N configured, constructed or designed to provide load balancing of the plurality of devices over one or more networks 104, 104', 104". The appliance 200 may use one or more load monitors 405A-405N to monitor the load of each of the heterogeneous devices. In one embodiment, the appliance 200 monitors the load of appliances 200A-200N. The appliance 200 and/or load monitor 405 uses the MEP protocol 540 to obtain metrics from one or more of the appliances 200A-200N. In another embodiment, the appliance 200 monitors the load of appliance 500A-500N. In other embodiments, the appliance 200 monitors the load of one or more serves 106. In still another embodiment, the appliance 200 monitors the load among servers in a server farm 38. The appliance 200 may use one or more network management protocols to obtain metrics from server 106, server farm 38, and appliances 500A-500N.

The appliance 200 collects metrics via the MEP protocol 540 and network management protocols from a wide variety of heterogeneous devices, such as appliances 500A-500N and servers 106, and homogenous devices 200A-220N. The appliance 200 stores the metrics in a GSLB (Global Server Load Balancing) or global metrics table 530 comprising any type and form of data storage element, such as a file, database, object or data structure in memory and/or on disk. The vServers 275 and/or load monitors 405 use one or more of the metrics from the GSLB metrics 530 to provide global load balancing of servers, server farms, virtual servers, and load balancing devices.

The appliance 200 may collect and monitor metrics obtained via a MEP protocol 540 from one or more appliance 200A-200N and store them in a MEP based metrics table 510A-510N. In one embodiment, the appliance 200 uses a first type or first version of a MEP protocol 540 to obtain metrics from a first appliance 200A and stores the metrics in a first table 510A. In another embodiment, the appliance 200 uses a second type or second version of a MEP protocol 540' to obtain metrics from a second appliance 200N and stores the metrics in a second table 510N.

The appliance 200 may collect and monitor metrics from appliances 500A-500N using any type and form of network management protocol (NMP) and store the metrics in a NMP based metrics table 520A-520N. In one embodiment, the appliance 200 uses a SNMP protocol and communication model to obtains metrics from a second type of appliance 500A and stores the metrics in a NMP based metric table 520A. In some embodiments, the appliances 200 uses a second type of network management protocol, such as CIMP, to obtain from a second or third type of appliance SOON and stores the metrics in a NMP based metric table 520N. In some embodiments, appliance 500A is a different type of appliance than appliance SOON but both appliances support the same network management protocol for providing metrics.

The appliance 200 may also collect and monitor metrics from a server 106 and/or server arm 38 using any type and form of network management protocol (NMP) and store the metrics in a NMP based metrics table 520A'-520N'. In one embodiment, the appliance 200 uses the same network management protocol, such as SNMP, for obtaining metrics from a server 106 as used for obtaining metrics from one of the appliances 500A-500N. In another embodiments, the appliance 200 uses a different type of network management protocol for obtaining metrics from the server than is used by the appliance 200 for obtaining metrics from an appliance 500.

The appliance 200 may store metrics for the GSLB metrics 520 in a separate table for each device. For example, the appliance 200 may store metrics for a first appliance 200A in a first metrics table 510A, and metrics from a second appliance 520A in a second metrics table 520A. The appliance 200 may store metrics from a server 106 in a server metrics tables 520A'. In another embodiment, the appliance 200 stores metrics from a server farm 38 to a metrics table 520N' for the server farm.

The appliance 200 may store metrics for the GSLB metrics 520 in a separate table for each type of protocol. For example, the appliance 200 may store all MEP based metrics from a plurality of appliances 200A-200N in a first metrics table. In some embodiments, the appliance 200 stores a first type or version of MEP protocol based metrics in a first table 510A and a second type or version of an MEP protocol in a second table 510N. The appliance 200 may store all SNMP based metrics from one or more appliances 500A-500N in a second metrics table. In another example, the appliance may store metrics from a second type of network management protocol from one or more appliances 500A-500N to a third metrics table.

The GSLB metrics 530 may comprise any type and form of data, statistics, status or information related to or associated with the operational and/or performance characteristics of the appliance 200, 500, a server 106 or server farm 38. The global metrics 530 may comprise any type and form of data, statistics, status or information related to the network of the appliance 200,500, and/or server 106 or server farm 38. The global metrics 530 may comprise any type and form of data, statistics, status or information related to the services 270A-270N load balanced by the appliance 200A-200N, 500A-500N. In some embodiments, the global metrics 530 comprises operational and/or performance data on any client 102 and/or server 106 connected to the appliance 200A-200N, 500A-500N. In one embodiment, the appliance 200A-200N, 500A-500N determines operational and/or performance information about any client 102 or server 106 it is connected to or servicing, and creates metrics on these clients 102 and/or server 106. In this embodiment, the appliance 200A-200N, 500A-500N may provide these metrics to the global load balancing appliance 200.

In some embodiments, the operational and/or performance characteristic provides a metrics includes information on any of the following for an appliance or server 1) load; 2) numbers and types of connections, 3) resource usage, 4) resource availability, 5) number of requests outstanding, 6) number of requests transmitted, 7) number of clients servicing, 8) response time information, including average and historical response times, 9) errors, status, performance or bandwidth of a connection, and 10) number of sessions, and states or status thereof. In another embodiment, the metrics 530 includes information on any IP or network layer information of the appliance 200A-200N, 500A-500N, or the connections of the appliance 200A-200N, 500A-500N, or of the clients and/or servers serviced by the appliance 200A-200N, 500A-500N. For example, the information provided via metrics 530 may include a routing table of the appliance 200A-200N, 500A-500N for performing network address translation, such as for an SSL VPN connection.

Via the configuration interface 425, a user may select one or more metrics 430 from the global metrics 530 to use for load monitoring and determining the load 440. The appliance 200 may receive information identifying a user selection of one or more metrics from the global metrics 530. The appliance may receive a user selection of one or more MEP based metrics 510 of a first type of appliance. The appliance may receive a user selection of one or more NMP based metrics 520 of a second type of appliance. The appliance may also receive a user selection of one or more NMP based metrics 520' for any server or server farm. The user may select any combination of metrics 430 from the global metrics 530 to configure the appliance 200 to perform load balancing of heterogeneous devices according to the user selected metrics.

In one embodiment, the appliance 200 uses appliance established metrics in combination with any one or more of the user selected metrics 430 for load balancing. For example, the appliance 200 may collect and monitor the number of connections, response time, bandwidth and numbers of packets for any appliance 200, 500 or server 106 and use these metrics with any user selected metrics for load balancing. Via the configuration interface 425 and as also discussed in conjunction with FIG. 4, the appliance 200 may receive information from the user identifying, designating or establishing weights 435 and/or thresholds 437 for any appliance established metrics and/or user selected metrics.

Although the systems of FIGS. 5A-5B are generally discussed in the context of global server load balancing, these systems may be used for local load balancing. The appliance 200 may use metrics obtained from heterogeneous devices, servers, or services using a plurality of protocols to load balance one or more services or servers. Using the techniques described herein, the appliance 200 is configurable and flexible to obtain metrics from any network resource—system, sub-system, application, service, device, etc—using either a metric exchange protocol supported by the appliance and/or a more general network management protocol supported by the network resource. Additionally, the appliance 200 is configurable to allow users to select any combination of available metrics from these heterogenous network resources to perform load monitoring and load balancing of one or more services.

Figure 6A:
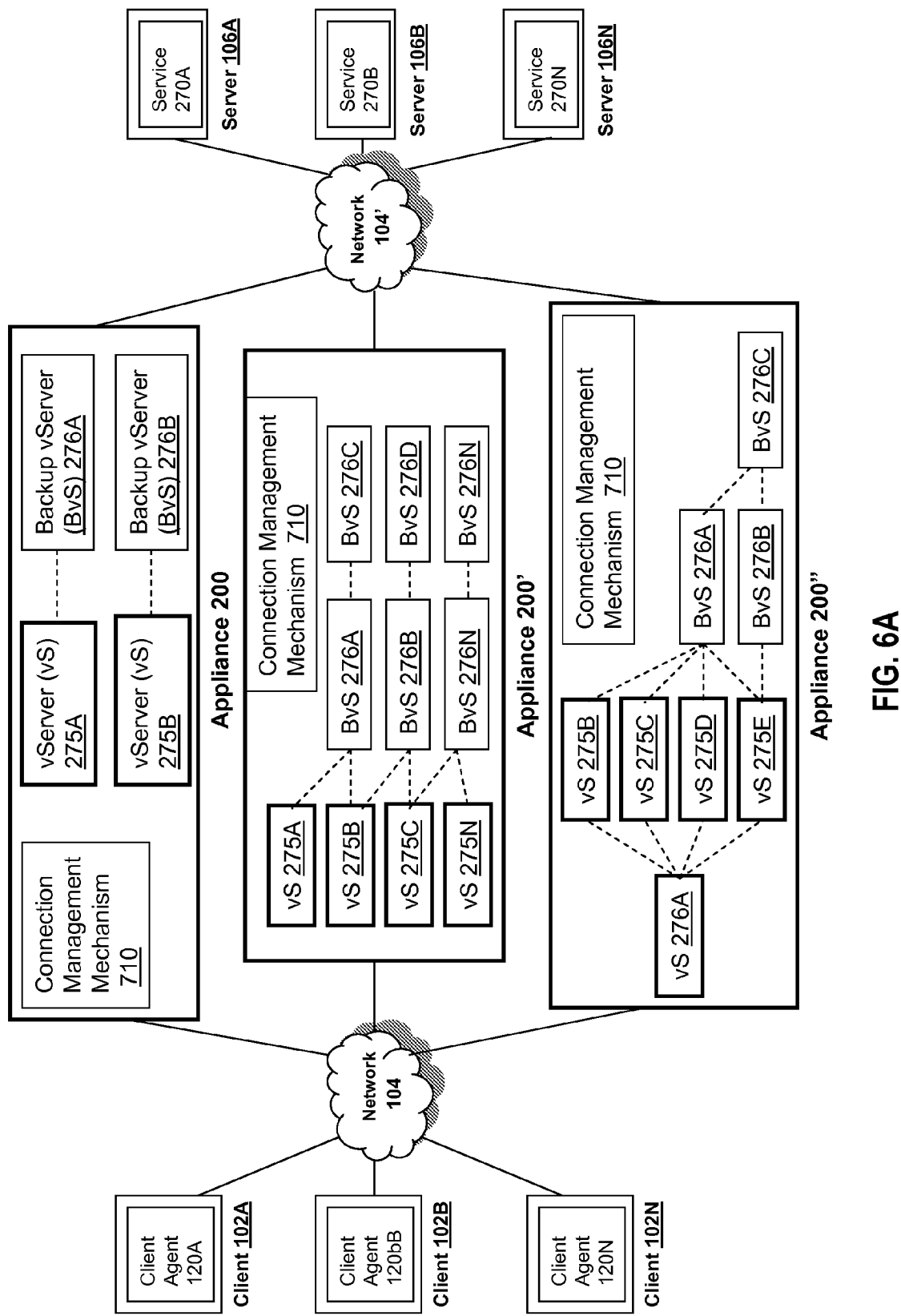
FIG. 6A is a block diagram of embodiments of a system performing load balancing via a plurality of virtual servers upon a failover using metrics from a backup virtual server.
Figure 6B:
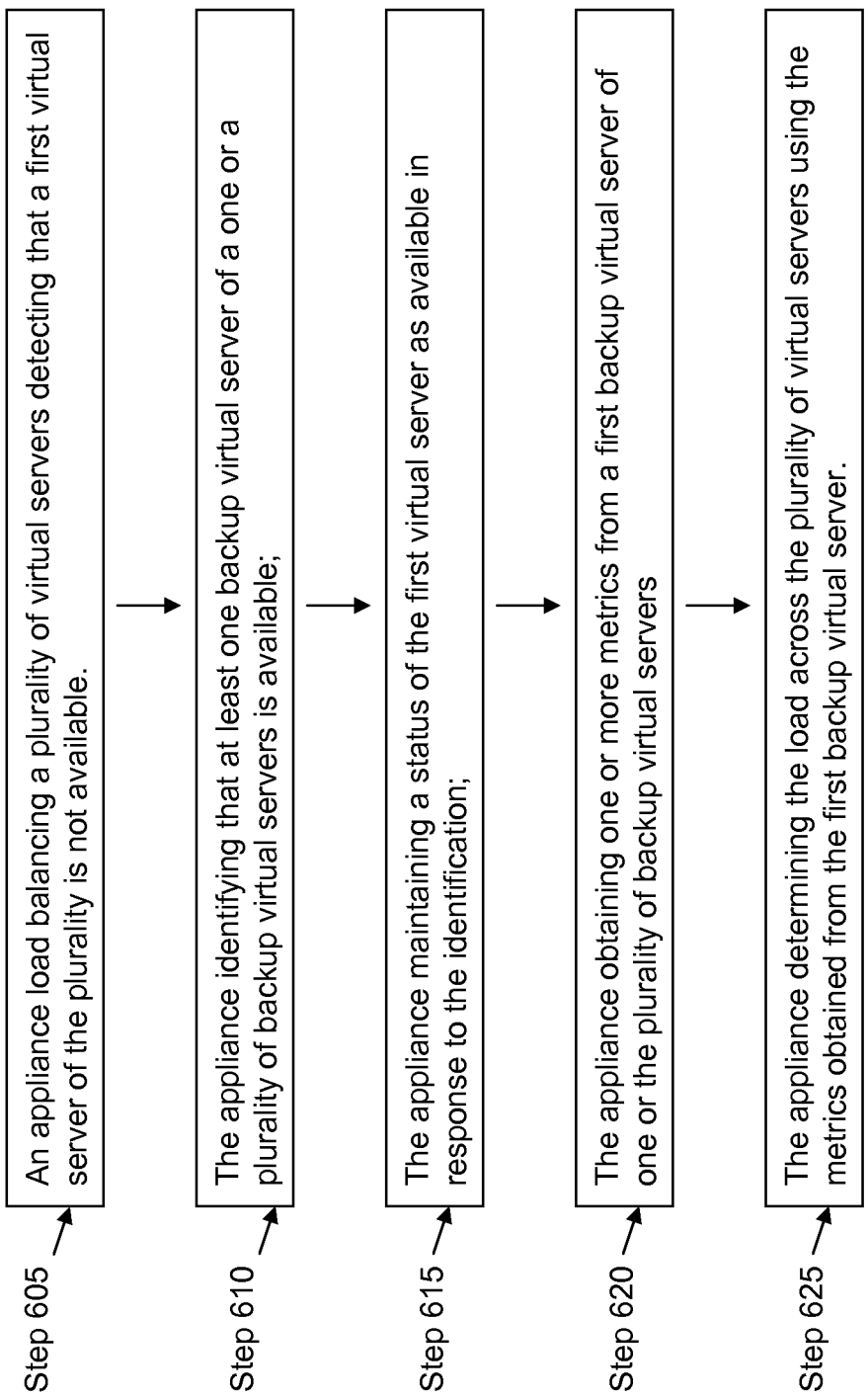
FIG. 6B is a flow diagram of steps embodiments of a method for performing load balancing via a plurality of virtual servers upon a failover using metrics from a backup virtual server.

F. Load Balancing Via a Plurality of Virtual Servers Upon Failover Using Metrics from a Backup Virtual Server Referring now to FIG. 6A and FIG. 6B, a number of systems and methods for performing load balancing upon a failover are depicted. FIG. 6A and FIG. 6B in some aspects present methods and systems of load balancing performed via a plurality of virtual servers upon a failover using metrics from a backup virtual server. A number of embodiments are illustrated wherein a virtual server 275 may be associated with, or linked to, one or more backup virtual servers 276. In some aspects, a virtual server 275 and a plurality of backup virtual servers 276 associated with the virtual server 275 may be viewed by the system or appliance 200 as one logical unit or a logical chain wherein any backup virtual server 276 is capable of taking over or performing any function of the virtual server 275. Sometimes a virtual server 275 may be referred to as a vS 275 or a vServer 275. Similarly, a backup virtual server 276 may sometimes be referred to as a BvS 276 or a BvServer 276. In a number of embodiments, a BvS 276 may comprise any and all features and any and all functionality of a vS 275.

FIG. 6A illustrates a number of embodiments of the appliance 200 performing load balancing via a plurality of virtual servers upon a failover using metrics from a backup virtual server. In brief overview, a plurality of client agents 120A-120N are running on clients 102A-102N, respectively. A plurality of servers 106A-106N are running services 270A-270N on each of the servers 106A-160N, respectively. Communication between clients 102 and servers 106 traverses one of the appliances 200, 200' and 200" via networks 104 and 104'. Appliances 200, 200' and 200" are sometimes referred to as appliance 200. Appliance 200, in some embodiments, comprises a connection management mechanism 710, one or more vServers 275 and one or more BvServers 276 associated with vServers 275 in a variety of arrangements and settings.

Connection management mechanism 710, also referred to as CMM 710, may comprise a software, a hardware, or any combination of software and hardware to control or manage communication within the appliance 200. In some embodiments, CMM 710 includes logic, functions or software applications for receiving, directing or redirecting connection requests, data or instructions from a client 102 or a server 106.

In some embodiments, the connection management mechanism 710 receives or intercepts transport layer connection requests or communications between the clients 102A-102N and one or more services 270A-270N. The connection management mechanism 710 may include an application, program, service, process, task, thread or any type and form of executable instructions. In other embodiments, the connection management mechanism 710 identifies, determines or selects a vServer 275 for processing a communication received from a client 102 or a server 106. In some embodiments, the connection management mechanism 710 identifies, determines or selects a BvS 276 for processing a communication received from a client 102 or a server 106.

In some embodiments, the connection management mechanism 710 determines if a dynamic maximum connection threshold has been reached or exceeded. The connection management mechanism 710 may determine if the dynamic maximum connection threshold is exceeded. In a number of embodiments, CMM 710 may also determine whether or not to establish second virtual server 275N or a backup virtual server 276N, e.g., a spillover vServer or a BvServer. Upon detecting that a number of active transport layer connections of the first vServer 275A or BvServer 276A exceeds a threshold, such as a dynamically adjusted maximum connection threshold, the connection management mechanism 710 may direct, transfer or otherwise provide a received transport layer connection request to a second vServer 275N or a second BvServer 276N for handling. In some embodiments, CMM 710 uses dynamically adjusted maximum connection threshold to determine when to automatically spillover connection requests from a first vServer 275A to a backup virtual server 276A or second vServer 275N. In a number of embodiments, CMM 710 uses dynamically adjusted maximum connection threshold to determine when to redirect requests intended for a first virtual server 275A toward a first backup virtual server 276A, BvS 276N, or any other vS 275 or BvS 276.

In a number of embodiments, any one of a load monitor 405, a CMM 710 or an appliance 200 may associate a specific BvS 276A to a specific vS 275A. In some embodiments, a vS 275A is detected or identified as not available and connection requests or communication traffic that were previously handled by the vS 275A are automatically redirected or reassigned to the BvS 276A. In such cases BvS 276A takes over handling of the connection requests or the communication traffic previously handled by the vS 275A. In a plurality of embodiments, load monitor 405, CMM 710 or an appliance 200 dynamically or automatically redirect connection requests or traffic previously handled by vS 275A to a BvS 276A upon receiving the information that vS 275A is no longer available. In a number of embodiments, load monitor 405, CMM 710 or appliance 200 assign BvS 276A to be a first backup virtual server for handling connection requests or traffic which were previously handled by the vS 275A. In certain embodiments, load monitor 405, CMM 710 or appliance 200 assign BvS 276B to be a second backup virtual server to take over connection requests or communication traffic which were previously handled by the BvS 276A in case BvS 276A is detected or identified as not available. In a plurality of embodiments, load monitor 405, CMM 710 or appliance 200 automatically redirect connection requests or traffic which were previously handled by vS 275A to BvS 276A in case the vS 275A is detected or identified as not available. In some embodiments, load manager 405, CMM 710 or appliance 200 redirect connection requests or traffic which were previously handled by BvS 276A to the BvS 276B when BvS 276A is detected or identified as not available.

In other embodiments, the connection management mechanism 710 maintains connection or session persistence between a client 102 or a server 106 and the vServer 275 or BvServer 276 handling requests for the client 102 or the server 106. In some embodiments, the connection management mechanism 710 selects the spillover vServer 275N for handling a client request even though the number of active connections of the first vServer 275A does not exceed the maximum connection threshold 720. In other embodiments, the connection management mechanism selects the first vServer 275A for handling a client request event though requests from other clients are directed to the spillover vServer 275N or the BvServer 276. In some embodiments, the connection management mechanism 710 may select the first vServer 275A or second vServer 275N based on which vServer 275 most recently handled a request from the client 102 or the server 106. In a number of embodiments, the connection management mechanism 710 may select the first BvServer 276A or second BvServer 276N based on which vServer 275 or BvServer 276 most recently handled a request from the client 102 or the server 106.

Upon detecting the dynamically adjusted maximum connection threshold 720 has been exceeded for the first vServer 275A and/or the second vServer 275N, the connection management mechanism, in some embodiments, may determine to establish a spillover virtual server 275 or a backup virtual server 276. Upon detecting the dynamically adjusted maximum connection threshold 720 has been exceeded for the first vServer 275A and/or the second vServer 275N, the connection management mechanism, in some embodiments, may determine not to establish another spillover vServer 275N but instead redirects the client 102 directly to a server 106 or otherwise to bypass the appliance 200. Sometimes upon detecting the dynamically adjusted maximum connection threshold 720 has been exceeded for the first vServer 275A and/or the second vServer 275N or a first vServer 276A, the connection management mechanism 710 may determine not to establish another spillover vServer 275N or a BvServer 276N but instead redirects the client 102 directly to a server 106 or otherwise to bypass the appliance 200. For example, the connection management mechanism 710 may determine the dynamically adjusted maximum connection threshold 720B for the spillover vServer 275N or the first BvServer 276 has been reached and may redirect the client 102 to bypass the appliance 200 instead of establishing a third vServer 275N for spillover or a second BvServer 276. In some embodiments, upon detecting the dynamically adjusted maximum connection threshold 720 has been exceeded for the first vS 275A and/or the second vS 275N, the connection management mechanism may determine to establish another spillover BvS 276N. In these embodiments, the connection management mechanism may transmit a redirect Uniform Resource Locator (URL) to the client 102 for the client 102 to connect to in response to the client's connection request. The URL 760 may identify any one of the servers 106 or services 270.

Any one vS 275 or a BvS 276 associated with a particular vS 275, capable of taking over and implementing any functionality of the particular vS 275 in case the vS 275 is detected as not available may be considered a part of a logical unit or a logical chain associated with the particular vS 275. In some embodiments, a load monitor 405, a CMM 710 or an appliance 200 views a vS 275A and a plurality of BvS 276 associated with the vS 276A as a single logical unit or a single logical chain. Each individual part of a single logical unit or a single logical chain associated with a vS 275A may be capable of performing any functionality of the vS 275A or any other vS 275 or BvS 276 within the same logical unit or the logical chain.

In a plurality of embodiments, vS 275 may be detected as unavailable because of technical problems causing the vS 275 to stop functioning. In a number of embodiments, vS 275 is detected as not available because the vS 275 has reached a maximum capacity for the traffic the vS 275 is capable of handling. In such embodiments, vS 275 may be detected as not available even though it is still functional. In some embodiments, the vS 275 is detected as not available and a flag or a signal marking that the vS 275 is still available is still maintained despite the detection. In a plurality of embodiments, even though vS 275 is detected as not available, any one of, or any combination of a CMM 710, a load monitor 405 or an appliance 200 maintains a status, a signal or a flag of the vS 275 as available despite the detection.

A BvS 276A, associated with vS 275A, in some embodiments, gathers, generates or maintains metrics relating traffic or requests associated with the vS 275A while the vS 275A is still detected as available. In some embodiments, the appliance 200 comprising the vS 275A gathers, generates or maintains metrics relating the traffic or the requests associated with the vS 275A while the vS 275A is still detected as available. In a number of embodiments, when the vS 275A is detected as not available, the appliance 200 or the BvS 276A obtains the metrics gathered, generated or maintained by the appliance 200 or by the BvS 276A and determines the load across the plurality of load servers 275 using the metrics. In a plurality of embodiments, when the vS 275A is detected as not available, any part of the logical chain or the logical unit associated with vS 275A may obtain metrics gathered, generated or maintained by any part of the logical unit or the logical chain and determine the load across the plurality of load servers 275 using the metrics.

In numerous embodiments, as the metrics from a BvS 276 associated with the vS 275A are utilized to determine the load across the plurality of load servers 275, a user whose requests are load balanced does not experience any delays due to the vS 275A being detected as unavailable. By using the systems and methods herein described, a virtual server 275A of a plurality of virtual servers 275 may fail or become unavailable without impacting the load balancing or causing delays even temporarily. A virtual server 275A may thus fail without impacting the load balancing since the metrics of the BvS 276 associated with the virtual server 275A help maintain the balance of the load over all virtual servers 275 despite some one or more of virtual servers 275 being unavailable.

In some embodiments, the appliance 200 determines load across a plurality of virtual servers 275 using metrics from any number of virtual servers 275 or backup virtual servers 276. In a plurality of embodiments, the appliance 200, load monitor 405 or CMM 710 utilizes a portion of metrics of the first virtual server 275A and a portion of metrics of the first backup virtual server 276A to determine load across the plurality of virtual servers 275. In a number of embodiments, the appliance 200, load monitor 405 or CMM 710 combine metrics of any number of virtual servers 275 and backup virtual servers 276 to determine load across the plurality of virtual servers 275. Sometimes, metrics from a vS 275A and a number of BvS 276 may be combined or averaged to determine load across the plurality of vS 275, wherein the vS 275A is a part of the plurality. In some embodiments, the appliance 200, load monitor 405 or CMM 710 determine load across the plurality of vS 275 using metrics from any number of BvS 276 in charge of taking over the functionality of the vS 275 in case the vS 275 is detected as not available. In many embodiments, the appliance 200, load monitor 405 or CMM 710 determine load across the plurality of vS 275 combining or averaging metrics from any number of BvS 276 in charge of taking over the functionality of the vS 275 in case the vS 275 is detected as not available.

In yet another embodiment, the appliance 200 and/or connection management mechanism manages the number of active connections and performs dynamic spillover techniques for a plurality of vServers 275A-275N. In one embodiment, the second vServer 275B may be managing connections from a plurality of clients 102A-102N to a second set of services 270A'-270N'. In some embodiments, the appliance 200 monitors a second dynamic maximum connection threshold 720B for a second vServer 275B. In one embodiment, the second vServer 275B may be acting as a spillover vServer for the first vServer 275N or a third vServer.

A monitoring agent 405 or load monitor 405 may be used for detecting or identifying available vServers 275 or BvServers 276. A monitoring agent may also be used for detecting or identifying vS 275 or BvS 276 which are not available. In some embodiments, a CMM 710 may comprise a monitoring agent 405 or comprise any and all functionalities of a monitoring agent 405. In a number of embodiments, a monitoring agent 405 may comprise a CMM 710 or comprise any and all functionalities of a CMM 710. In some embodiments, a monitoring agent 405 may be used to establish or maintain a status of a vServer 275 or a BvServer 276 as available or unavailable.

In a plurality of embodiments, a monitoring agent 405 may identify a first vS 275A and a number of BvServers 276 identified or selected as backup virtual servers of the first vS 275A. In some embodiments, a monitoring agent 405 or a CMM 710 identifies a first vServer 275A and a number of BvServers 276 associated with the first vServer 275A as a logical unit, or as a single system wherein the vServer 275A or any of the BvServers 276 associated with the vServer 275A may perform any functionality of the first vServer 275A. In a plurality of embodiments, a monitoring agent 405 or a CMM 710 identifies or establishes an order in which one of a number of BvServers 276 associated with a first vServer 275A takes over a function which was previously performed by the first vServer 275. In certain embodiments, one of a number of BvServers 276 associated with a first vServer 275A may provide metrics for determining the load across the plurality of servers load balanced by the appliance 200 comprising the first vServer 275 and BvServers 276.

In some embodiments, a load monitor 405, CMM 710 or appliance 200 may identify a first vServer 275A from the plurality of virtual servers and two backup virtual servers, a first BvS 276A and a second BvS 276B, designated to perform a function performed by the first vServer 275A if the first vServer 275A is not available or identified as not available. In a number of embodiments, the load monitor 405, CMM 710 or appliance 200 may detect or identify that the first virtual server 275A is not available, and in response to the detection or the identification, maintain the status of the first vServer 275 as available. In a plurality of embodiments, load monitor 405, CMM 710 or appliance 200 may obtain metrics from the first BvS 276A and determine the load across the plurality of virtual servers using the metrics obtained from the first BvS 276. In some embodiments, a load monitor 405 may determine the load of the first vServer 275A, which was identified as unavailable, using the metrics from the first BvS 276A. In a plurality of embodiments, when the first vServer 275A and the first BvS 276A are both identified or detected as not available, the status of the first vServer 275A is maintained as available and the load across the plurality of virtual servers, of which vServer 275A is a part of, is determined using the metrics from the second BvS 276B. The second BvS 276B may be selected if the first BvS 276A is identified as unavailable and the vServer 275A is identified as unavailable. In a plurality of embodiments, the first vS 275A may have any number of BvS 276 assigned to perform the functionality of the first vS 275A and provide metrics for determining the load across the plurality of virtual servers vS 275A is a part of.

Still referring to FIG. 6A, an appliance 200 may comprise a CMM 710, two virtual servers, a vS 275A and a vS 275B, and two backup virtual servers, a BvS 276A and a BvS 276B. The BvS 276A may be selected as a primary backup virtual server of the vServer 275A, and the BvS 276B may be selected as a primary backup virtual server of the vServer 276B. The monitoring agent 405 may monitor the vS 275A and the vS 275B, as well as the statuses of the vS 275A and vS 275B. In addition, the monitoring agent 405 may view the vS 275A and the BvS 276A as a single logical unit, wherein either one of the vS 275A or the BvS 276A may perform the function normally performed by the vS 275A when vS 275A is available. If the monitoring agent 405 detects that the vS 275A is unavailable, in some embodiments, the monitoring agent may obtain the metrics from the vS 275B to determine the load across the vS 275A and the vS 275B. In a number of embodiments, the monitoring agent 405 after identifying that the vS 275A is unavailable may obtain and use the metrics from the BvS 276A to determine the load across the vS 275B and the BvS 276A while maintaining the status of the vS 275A as available. In certain embodiments, a load monitor 405 A may identify a vServer 275B as unavailable and in response to the identification maintain the status of the vServer 275B as available and in response to the identification obtain and use the metrics from the BvS 276B to determine the load across the vS 275A and the vS 275B. In a number of embodiments, BvS 276B and vS 275B may be viewed or identified by the load monitor 405 as a single unit wherein either one of the BvS 276B or the vS 275B may be referred to as the vS 275B and may able to perform the functions of the virtual server vS 275B.

FIG. 6A also illustrates an appliance 200' comprising a number of virtual servers vS 275, and a number of backup virtual servers BvS 276. Virtual servers vS 275A, vS 275B, vS 275C through vS 275N where N can be any number or symbol, are backed up by two rows of virtual servers, the first row having backup virtual servers BvS 276A, BvS 276B through BvS 276N and the second row having backup virtual servers BvS 276C, BvS 276D through BvS 276N where N can be any number or symbol. Virtual servers vS 275A and vS 275B have a designated backup virtual server BvS 276A. In addition, vS 275B and vS 275C are backed up by BvS 276B, and vS 275C through vS 275N are backed up by BvS 276N where N can be any number or symbol. FIG. 6A also illustrates BvS 276C backing up BvS 276A, BvS 276D backing up BvS 276B and BvS 276N backing up BvS 276N. Hence, BvS 276A may be designated to take over the functionalities of vS 276A or vS 276B if either one of the vS 276A or vS 276B are identified as not available, while BvS 276C may be designated to take over the functionality of BvS 276A if BvS 276A is identified as not available. In a number of embodiments, a load monitor 405 obtains and uses metrics from the BvS 276A in response to an identification that either vS 275A or vS 275B is not available to balance the load across the vS 275A through vS 275N wherein the BvS 276B takes over the functionality of the identified unavailable vS 275.

Appliance 200" is also illustrated by FIG. 6A. Appliance 200" comprises a virtual server vS 276A load balancing virtual servers vS 275B, vS 275C, vS 275D and vS 275E and a CMM 710. BvS 276A is a backup virtual server backing up virtual servers vS 275B, vS 275C, vS 275D and vS 275E. BvS 276B is a backup virtual server backing up vS 275E. In addition, BvS 276C is backing up BvS 276A and BvS 276B. In some embodiments, a load monitor 405 may obtain and use metrics from BvS 276A to determine the load across the vS 275B through vS 275E if one of vS 275B through vS 275E is identified as not available. In a plurality of embodiments, a load monitor 405 may obtain and use metrics from BvS 276A to determine the load across the vS 275B through vS 275E if one of vS 275B through vS 275E is identified as not available where the BvS 276A will replace or take over the functionality of the vS 275 identified as not available.

In a number of embodiments, a vS 275 may be backed up by one or a plurality of BvS 276 backup virtual servers, wherein any BvS 276 may perform any function of the vS 275. In some embodiments, a number of vServers 275 is backed up by one BvS 276. In a plurality of embodiments, a first BvS 276 is backed up by a second BvS 276 which may provide the metrics for determining the load across the plurality of virtual servers which the first BvS 276 and the second BvS 276 are backing up. Virtual servers 275 and backup virtual servers 276 may come in any setup or configuration, and may be used for load balancing any number of servers or any amount or type of network traffic.

Referring now to FIG. 6B, a method is illustrated comprising a number of steps for performing load balancing via a number of virtual servers upon a failover using metrics from a backup virtual server. In number of embodiments, the method presented is used for performing load balancing of a number of virtual servers 275 upon a failover using metrics from a backup virtual server 276A to load balance the number of virtual servers 276 and the backup virtual server 276A which takes over the function of an unavailable vS 275A from the plurality of vS 275.

In brief overview, in step 605 of the method 600 an appliance load balancing a plurality of virtual servers detects that a first virtual server of the plurality is not available. In some embodiments, an appliance comprises a load monitor 405 which detects availability of virtual servers 275. In a plurality of embodiments, an appliance comprises a plurality of virtual servers 275 load balancing another plurality of virtual servers 275. In some embodiments, the first virtual server 275A of the plurality may be any virtual server 275 of the plurality of virtual servers 275. In a number of embodiments, a virtual server 275A provides a load balancing for a plurality of virtual servers 275. In certain embodiments, an appliance may be an appliance 200, appliance 500, a client 102 or a server 106. In some embodiments, a plurality of backup virtual servers 276 is associated with one or a plurality of virtual servers 275.

In step 610, the appliance identifies that at least one backup virtual server 276A of a one or a plurality of backup virtual servers 276 is available. In some embodiments, the plurality of backup virtual servers 276 may come in any configuration such as the ones depicted appliances 200, 200' and 200" in FIG. 6A. In a number of embodiments, some of a plurality of backup virtual servers 276 are designated or associated with a plurality of virtual servers 275 in any configuration. In a plurality of embodiments, a backup virtual server 276 out of a plurality of backup virtual servers 276 is designated or associated with a specific virtual server 275 or a specific plurality of virtual servers 275. In some embodiments, the appliance 200 identifies a backup virtual server 276 as available. In a number of embodiments, a device physically separated from the housing within which the backup virtual server 276 is located identifies that at least one BvS 276A of the plurality of BvS 276 is available. In some embodiments, a CMM 710 or a load monitor 405 identifies the BvS 276A from the plurality of BvS 276 as available.

In step 615 the appliance maintains a status of the first virtual server as available in response to the identification. In some embodiments, the appliance maintains a status of a first virtual server vS 275A as available in response to the identification in step 610. In a number of embodiments, the appliance maintains a status of the first virtual server vS 275A as available in response to the detection in step 605. In a plurality of embodiments, the appliance maintains a status of the vS 275A as available in response to the identification in step 610 and the detection in step 605. In certain embodiments, the appliance maintains the status of the vS 275A which was detected as not available in step 605 as available in step 615 while treating a backup virtual server BvS 276A which is detected as available for backing up the vS 275A as the vS 275A or as a part of the vS 275A or using the BvS 276A to perform all of the functions of the vS 275A, instead of the vS 275A. In some embodiments, the appliance may view or treat the BvS 276A which is identified as available in step 610 as another vS 275A able to fully replace and perform all the functionality of vS 275A, or as a part of the vS 275A.

In step 620 the appliance obtains one or more metrics from a first backup virtual server of one or the plurality of backup virtual servers. In some embodiments, the metrics obtained from the BvS 276 in step 620 may comprise all the metrics of a vS 276. In a plurality of embodiments, the metrics obtained from the BvS 276 are selected metrics necessary to perform load balancing. In a number of embodiments, the metrics obtained from a BvS 276 in step 620 comprise any metrics necessary to perform any function of the BvS 276, vS 276A of the plurality of virtual servers 276 detected as not available in step 605, and the plurality of virtual servers 276 to determine the load across the plurality of virtual servers 276. In some embodiments, the metrics obtained from the BvS 276 in step 620 may comprise any metrics necessary to perform any function of BvS 276, vS 276A of the plurality of virtual servers 276 detected as not available in step 605, and the plurality of virtual servers 276 to determine the load across the plurality of virtual servers 276 and the BvS 276.

In step 625 the appliance determines the load across the plurality of virtual servers using the metrics obtained from the first backup virtual server. The determination of the load across the plurality of virtual servers 276 in step 625, in some embodiments, may include a BvS 276 providing the metrics while maintaining the status of the first virtual server vS 275A detected as not available in step 605 as available despite the detection. In some embodiments, the determination of the load across the plurality of virtual servers may include the load across any number of backup virtual servers 276 assisting any number of virtual servers 275.

Many alterations and modifications may be made by those having ordinary skill in the art without departing from the spirit and scope of the invention. Therefore, it should be clear that any of the embodiments presented above may be combined with any other embodiments above for expressing any other aspects of the invention. It should also be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method of load balancing a virtual server using a metric from a backup virtual server, the method comprising:
   (a) identifying, by a device intermediary to a plurality of clients and a plurality of servers, that a backup virtual server is available for a virtual server executing on the device that is detected as not available;
   (b) maintaining, by the device, a status of the virtual server as available in response to identifying the backup virtual server is available; and
   (c) determining, by the device, a load of the virtual server using a metric of the backup virtual server.

2. The method of claim 1, wherein step (a) further comprises identifying that the backup virtual server, executing on the device, is available responsive to detecting that the virtual server is not available.

3. The method of claim 1, wherein step (a) further comprises detecting, by a monitoring agent of the device from monitoring the virtual server, that the virtual server is not available.

4. The method of claim 1, wherein step (b) further comprises not changing, by the device, the status of the virtual server responsive to detecting that the virtual server is not available.

5. The method of claim 1, wherein step (c) further comprises obtaining, by the device, one or more metrics from the backup virtual server.

6. The method of claim 1, wherein step (c) further comprises load balancing, by the device, the virtual server based on the load determined using the metric of the backup virtual server.

7. The method of claim 1, further comprising detecting, by the device, that the backup virtual server is no longer available.

8. The method of claim 7, further comprising identifying, by the device, a second backup virtual server to the virtual server is available while maintaining the status of the virtual server as available.

9. The method of claim 8, further comprising determining a second load of the virtual server using a second metric from the second backup virtual server.

10. The method of claim 8, further comprising determining a second load of the virtual server using a metric from the backup virtual server and a second metric from the second backup virtual server.

11. A system of load balancing a virtual server using a metric from a backup virtual server, the system comprising:
    a device intermediary to a plurality of clients and a plurality of servers;
    a virtual server executing on the device, the virtual server managing access to the plurality of servers by the plurality of clients;
    a backup virtual server to the virtual server;
    a monitor executing on the device detecting that the virtual server is not available;
    wherein responsive to identifying that the backup virtual server is available, the device maintains a status of the virtual server as available and determines a load of the virtual server using a metric of the backup virtual server.

12. The system of claim 11, wherein the backup virtual server executes on the device and the device identifies that the backup virtual server is available responsive to detecting that the virtual server is not available.

13. The system of claim 11, wherein the monitor detects from monitoring the virtual server, that the virtual server is not available.

14. The system of claim 11, wherein the device maintains the status of the virtual server by not changing the status of the virtual server responsive to detecting that the virtual server is not available.

15. The system of claim 11, wherein the device obtains one or more metrics from the backup virtual server.

16. The system of claim 11, wherein a load balancer load balances the virtual server based on the load determined using the metric of the backup virtual server.

17. The system of claim 11, wherein the device detects that the backup virtual server is no longer available.

18. The system of claim 17, wherein the device identifies a second backup virtual server to the virtual server is available while maintaining the status of the virtual server as available.

19. The system of claim 18, wherein the device determines a second load of the virtual server using a second metric from the second backup virtual server.

20. The system of claim 18, wherein the device determines a second load of the virtual server using a metric from the backup virtual server and a second metric from the second backup virtual server.

\* \* \* \* \*